US010082695B2

(12) United States Patent
Baek et al.

(10) Patent No.: US 10,082,695 B2
(45) Date of Patent: Sep. 25, 2018

(54) DISPLAY DEVICE HAVING LIGHT BLOCKING MEMBER FORMED ON COLOR FILTER ON ARRAY SUBSTRATE

(71) Applicant: Samsung Display Co. Ltd., Yongin-si (KR)

(72) Inventors: Hyun Woong Baek, Seoul (KR); Wan Soon Im, Cheonan-si (KR); Jang Bog Ju, Seongnam-si (KR); Seung Hwan Kim, Asan-si (KR); Hyo Seop Kim, Asan-si (KR); Seung Ho Lee, Gimhae-si (KR); So Mi Jung, Daegu (KR); Kang Wook Heo, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1 day.

(21) Appl. No.: 15/183,108

(22) Filed: Jun. 15, 2016

(65) Prior Publication Data

US 2017/0160583 A1 Jun. 8, 2017

(30) Foreign Application Priority Data

Dec. 4, 2015 (KR) .................... 10-2015-0172062

(51) Int. Cl.
G02F 1/1335 (2006.01)
G02F 1/1362 (2006.01)
G02F 1/1333 (2006.01)
G02F 1/1368 (2006.01)

(52) U.S. Cl.
CPC ...... *G02F 1/133512* (2013.01); *G02F 1/1368* (2013.01); *G02F 1/13624* (2013.01); *G02F 1/133305* (2013.01); *G02F 1/136209* (2013.01); *G02F 1/136286* (2013.01); *G02F 2001/133388* (2013.01); *G02F 2001/136222* (2013.01)

(58) Field of Classification Search
CPC ......... G02F 1/133512; G02F 1/136209; G02F 1/13624; G02F 1/136286; G02F 1/1368; G02F 1/133305; G02F 2001/136222; G02F 2001/133388
See application file for complete search history.

(56) References Cited

U.S. PATENT DOCUMENTS

| 8,035,779 | B2 | 10/2011 | Baek et al. | |
| 8,077,275 | B2 | 12/2011 | Yang et al. | |
| 8,169,569 | B2 | 5/2012 | Kang et al. | |
| 2004/0105050 | A1* | 6/2004 | Hsu | G02F 1/133514 349/106 |
| 2004/0227895 | A1* | 11/2004 | Yoo | G02F 1/133516 349/152 |

(Continued)

*Primary Examiner* — Tracie Y Green
(74) *Attorney, Agent, or Firm* — Cantor Colburn LLP

(57) ABSTRACT

A display device includes a first substrate and a second substrate, which face each other, and each of which includes a display area and a non-display area disposed outside the display area, a first light-blocking layer disposed in the non-display area, and a dummy color layer, in which a boundary dividing the display area and the non-display area is defined, and which is disposed in the non-display area of the first substrate to be adjacent to the boundary, where the dummy color layer includes a section in which a distribution density of the dummy color layer is decreased from the boundary to the outside of the non-display area.

21 Claims, 22 Drawing Sheets

(56) References Cited

U.S. PATENT DOCUMENTS

| | | | |
|---|---|---|---|
| 2005/0018108 A1* | 1/2005 | Okumura | G02B 5/201 349/106 |
| 2005/0243261 A1* | 11/2005 | Chiang | G02F 1/133514 349/155 |
| 2008/0074520 A1* | 3/2008 | Matsuda | H01L 27/14627 348/294 |
| 2012/0100662 A1* | 4/2012 | Watanabe | H01L 27/14621 438/70 |
| 2013/0155537 A1* | 6/2013 | Liu | G02B 5/201 359/891 |
| 2014/0211136 A1* | 7/2014 | Fukuoka | G02F 1/13394 349/106 |
| 2017/0053949 A1* | 2/2017 | Shin | G02F 1/136286 |
| 2017/0102578 A1* | 4/2017 | Shin | G02F 1/133512 |

\* cited by examiner

DISPLAY DEVICE HAVING LIGHT BLOCKING MEMBER FORMED ON COLOR FILTER ON ARRAY SUBSTRATE

This application claims priority to Korean Patent Application No. 10-2015-0172062, filed on Dec. 4, 2015, and all the benefits accruing therefrom under 35 U.S.C. § 119, the content of which in its entirety is herein incorporated by reference.

BACKGROUND

1. Field

Exemplary embodiments of the invention relate to a display device.

2. Description of the Related Art

Generally, a liquid crystal display ("LCD") device includes an array substrate, a counter substrate facing the array substrate, and a liquid crystal layer interposed between the array substrate and the counter substrate. The LCD includes a display area in which a plurality of pixels are disposed to display an image and a non-display area which is disposed at the periphery of the display area and in which a drive circuit and the like are disposed.

Recently, a high-transmittance LCD device employing a color-filter on array ("COA") substrate in which a color filter is formed on an array substrate has been developed. In the bonding process of a COA substrate and a counter substrate provided with a light blocking member, misalignment may occur. In order to prevent the misalignment, a black matrix on array ("BOA") substrate in which a light blocking member is formed on a COA substrate has been developed. Moreover, a shading holing member (also referred to as black column spacer ("BCS")), which simultaneously forms a light blocking pattern and a column spacer for maintaining the distance between the light blocking pattern and the substrate with the same material, has also been developed.

SUMMARY

Generally, a light-blocking layer is disposed in the non-display area of a liquid crystal device. However, in a case of a liquid crystal display ("LCD") having a black column spacer ("BCS") structure, a density of the light-blocking layer may be rapidly changed at the border between the display area and non-display area of the LCD device. Due to such a change in density of the light-blocking layer, in a process of forming the light-blocking layer, the light-blocking layer located at the edge of the display area may be overdeveloped, and thus light leakage may occur.

In order to solve the above problems, exemplary embodiments of the invention provide a display device which has a structure for preventing the occurrence of light leakage at the edge of the display area of the display device.

According to an exemplary embodiment of the invention, there is provided a display device, including a first substrate and a second substrate, which face each other, and each of which includes a display area and a non-display area disposed outside the display area, a first light-blocking layer disposed in the non-display area, and a dummy color layer, in which a boundary dividing the display area and the non-display area is defined, and which is disposed in the non-display area of the first substrate to be adjacent to the boundary, where the dummy color layer includes a section in which a distribution density of the dummy color layer is decreased from the boundary to the outside of the non-display area.

In an exemplary embodiment, the first light-blocking layer may include a section in which a distribution density of the first light-blocking layer is increased from the boundary to the outside of the non-display area.

In an exemplary embodiment, the section of the first light-blocking layer and the section of the dummy color layer may at least partially overlap each other.

In an exemplary embodiment, an opening portion at least partially penetrating the first light-blocking layer may be defined in the display device, where the opening portion exposes at least partially an upper surface of the dummy color layer.

In an exemplary embodiment, the opening portion may include a section in which a distribution density of the opening portion is decreased from the boundary to the outside of the non-display area.

In an exemplary embodiment, the section of the opening portion and the section of the dummy color layer may at least partially overlap each other.

In an exemplary embodiment, the display device may further include a second light-blocking layer disposed in the display area of the first substrate, where the first light-blocking layer and the second light-blocking layer are spaced apart from each other with the opening portion therebetween.

In an exemplary embodiment, the dummy color layer may include a first dummy color layer and a second dummy color layer disposed on the first dummy color layer, and at least one of the first dummy color layer and the second dummy color layer may be a blue dummy color layer.

In an exemplary embodiment, the dummy color layer may further include a third dummy color layer disposed on the second dummy color layer, and at least one of the first dummy color layer, the second dummy color layer, and the third dummy color layer may a blue dummy color layer.

In an exemplary embodiment, the display device may further include a lower metal layer disposed in the non-display area of the first substrate, where a stepped portion overlapping the lower metal layer is defined in the first light-blocking layer.

In an exemplary embodiment, the width of the lower metal layer may be equal to or greater than the width of the stepped portion.

In an exemplary embodiment, the dummy color layer may be intermittently disposed along the boundary.

According to another exemplary embodiment of the invention, there is provided a display device, including a first substrate and a second substrate, which face each other, and each of which includes a display area and a non-display area disposed outside the display area, a first light-blocking layer disposed in the non-display area, and a dummy color layer, in which a boundary dividing the display area and the non-display area is defined, and which is disposed in the non-display area of the first substrate to be adjacent to the boundary, where the distribution density of the first light-blocking layer is increased from the boundary to the outside of the non-display area, and the distribution density of the dummy color layer is complementarily decreased from the boundary to the outside of the non-display area depending on the increase in the distribution density of the first light-blocking layer.

In an exemplary embodiment, the distribution density of the first light-blocking layer may be stepwisely increased from the boundary to the outside of the non-display area, and thus the distribution density of the dummy color layer may be stepwisely decreased from the boundary to the outside of the non-display area.

In an exemplary embodiment, the distribution density of the first light-blocking layer may be irregularly increased from the boundary to the outside of the non-display area, and thus the distribution density of the dummy color layer may be irregularly decreased from the boundary to the outside of the non-display area.

In an exemplary embodiment, an opening portion at least partially penetrating the first light-blocking layer may be defined in the display device, where the opening portion exposes at least partially an upper surface of the dummy color layer.

In an exemplary embodiment, the display device may further include a second light-blocking layer disposed in the display area of the first substrate, where the first light-blocking layer and the second light-blocking layer are spaced apart from each other with the opening portion therebetween.

In an exemplary embodiment, the dummy color layer may include a first dummy color layer and a second dummy color layer disposed on the first dummy color layer, and at least one of the first dummy color layer and the second dummy color layer may be a blue dummy color layer.

In an exemplary embodiment, the dummy color layer may further include a third dummy color layer disposed on the second dummy color layer, and at least one of the first dummy color layer, the second dummy color layer, and the third dummy color layer may be a blue dummy color layer.

In an exemplary embodiment, the display device may further include a lower metal layer disposed in the non-display area of the first substrate, where a stepped portion overlapping the lower metal layer is defined in the first light-blocking layer.

In an exemplary embodiment, the width of the lower metal layer may be equal to or greater than the width of the stepped portion.

However, exemplary embodiments of the invention are not restricted to the one set forth herein. The above and other exemplary embodiments of the invention will become more apparent to one of ordinary skill in the art to which the invention pertains by referencing the detailed description of the invention given below.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
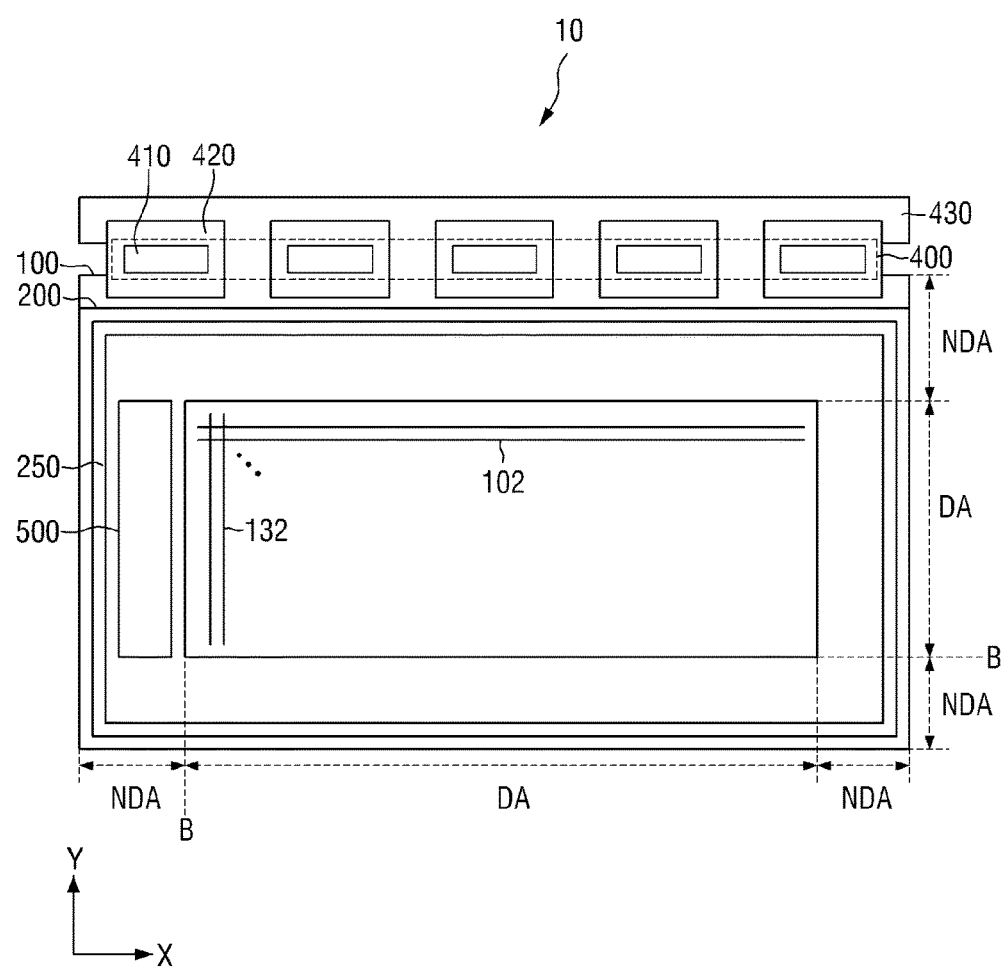
FIG. 1 is a plan view of an exemplary embodiment of an LCD device according to the invention.

The exemplary embodiments and features of the invention and methods for achieving the exemplary embodiments and features will be apparent by referring to the embodiments to be described in detail with reference to the accompanying drawings. However, the invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

The term "on" that is used to designate that an element is on another element or located on a different layer or a layer includes both a case where an element is located directly on another element or a layer and a case where an element is located on another element via another layer or another element. In the entire description of the invention, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, preferred embodiments of the invention will be described in detail with reference to the attached drawings.

Figure 2:
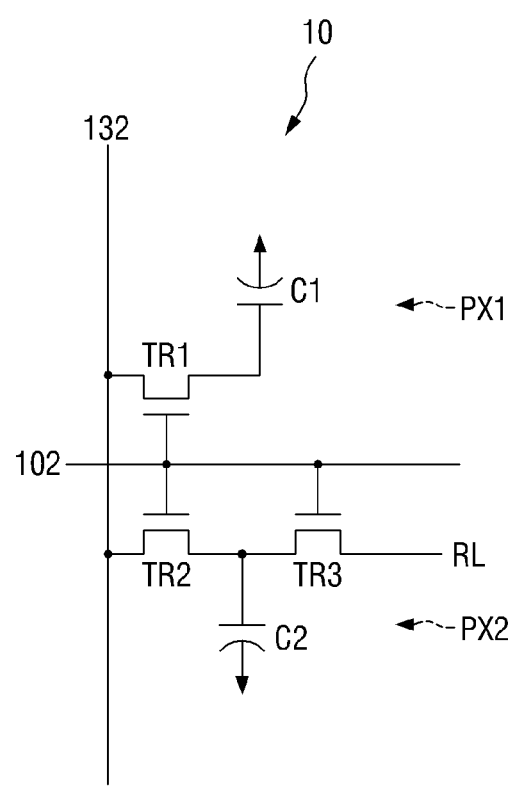
FIG. 2 is an equivalent circuit diagram of an exemplary embodiment of one pixel of an LCD device according to the invention.
Figure 3:
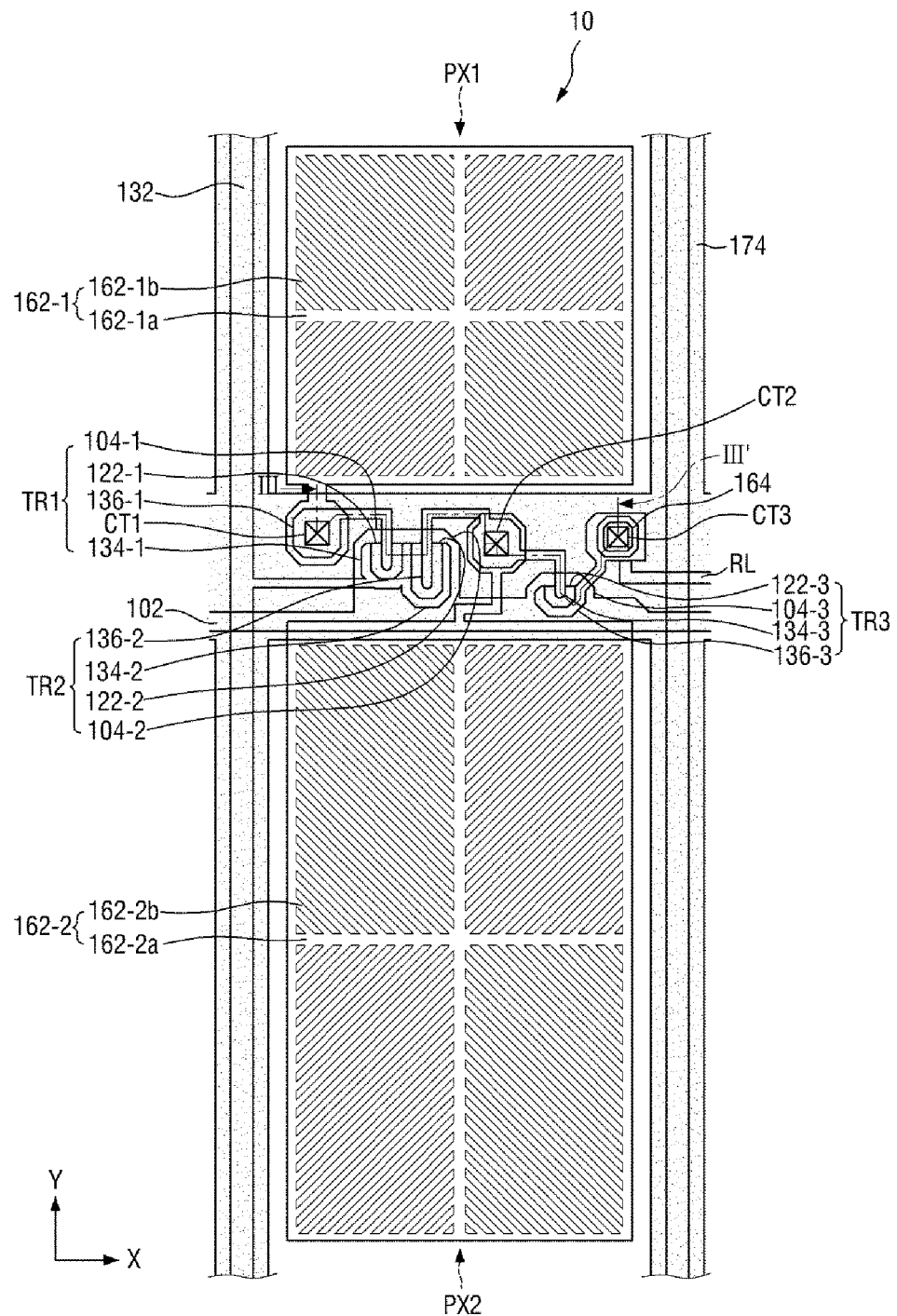
FIG. 3 is a plan view of an exemplary embodiment of one pixel of an LCD device according to the invention.
Figure 4:
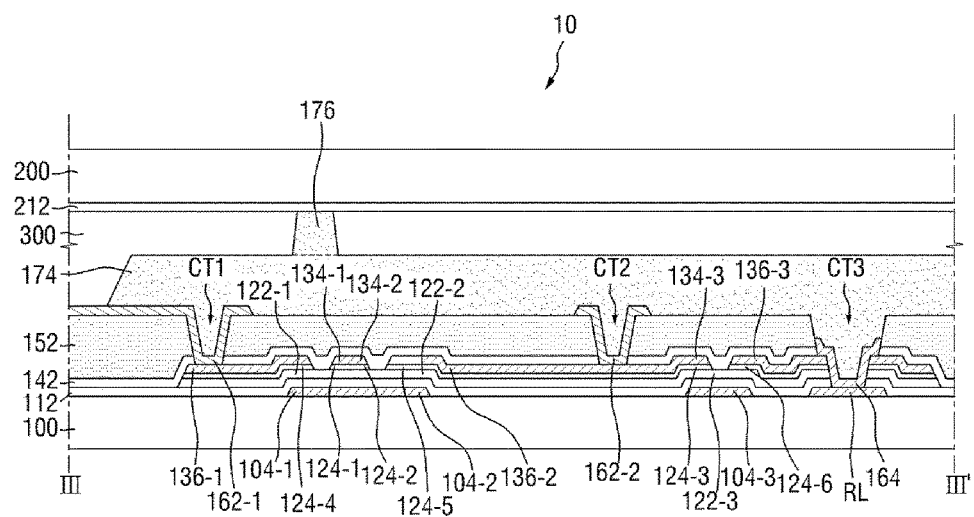
FIG. 4 is a cross-sectional view taken along line IV-IV' of FIG. 3.

FIG. 1 is a plan view of a liquid crystal display ("LCD") device according to an exemplary embodiment of the invention. FIG. 2 is an equivalent circuit diagram of one pixel of an LCD device according to an exemplary embodiment of the invention. FIG. 3 is a plan view of one pixel of an LCD device according to an exemplary embodiment of the invention. FIG. 4 is a cross-sectional view taken along line IV-IV' of FIG. 3.

Referring to FIGS. 1 to 4, the LCD device 10 according to an exemplary embodiment of the invention includes a first substrate 100, a second substrate 200 facing the first substrate 100, and a liquid crystal layer 300 interposed between the first substrate 100 and the second substrate 200.

Each of the first substrate 100 and the second substrate 200 includes a display area DA and a non-display area NDA. The display area DA is an area on which an image is display in the display device, and may be provided with a plurality of pixels arranged in the form of a matrix.

The non-display area NDA is disposed outside the display area DA, and is an area in which various signal lines are disposed to allow the display area DA to display an image. The display area DA may include a pixel area and a non-pixel area. The non-pixel area is a remaining area other than the pixel area in the display area DA. In an exemplary embodiment, the non-pixel area may be a boundary area disposed between pixels, and may include an area in which gate lines 102 and data lines 132 are disposed.

The non-display area NDA may be disposed along the outer periphery of the display area DA. In an exemplary embodiment, the non-display area NDA, as shown in FIG. 1, may be disposed along the outer periphery of the display area DA to have a band shape in a plan view, for example. A boundary B for dividing the non-display area NDA and the display area DA may be defined. That is, the non-display area NDA and the display area DA may be divided by the boundary B. In other words, the display area DA may be disposed inside the boundary B, and the non-display area NDA may be disposed outside the boundary B. In an exemplary embodiment, the boundary B, as shown in FIG. 1, may have a closed rectangular shape, for example. However, the shape of the boundary B is not limited thereto, and various shapes of boundaries B may be depending on the type of the display device.

In the display area DA of the first substrate 100, pixel electrodes 162-1 and 162-2 may be disposed for each pixel. The pixel electrodes 162-1 and 162-2 may receive a data voltage through a thin film transistor ("TFT"). The pixel electrodes 162-1 and 162-2 may form an electric field together with a common electrode 212 to control the alignment direction of liquid crystal molecules of the liquid crystal layer 300 disposed therebetween.

A data drive unit 400 for providing data drive signals and a gate drive unit 500 for providing gate drive signals may be disposed outside the display area DA of the first substrate 100.

The data drive unit 400 may receives image signals and data control signals from a timing controller (not shown). The data drive unit 400 may create analog data voltages corresponding to the image signals in response to the data control signals. The data drive unit 400 may provide the data voltages to the respective pixels through the data lines 132.

The data drive unit 400 may include a plurality of data drive chips 410. Each of the data drive chips 410 may be disposed (e.g., mounted) in the corresponding first flexible printed circuit board 420, and may be connected to a drive circuit board 430 and a data pad (not shown) of the non-display area NDA. Although not shown in the drawings, each of the first flexible circuit boards 420 mounted with the data drive chip 410 may be connected to the corresponding data pad by an anisotropic conductive film, for example.

The gate drive unit 500 may create gate signals in response to the gate control signals provided from the timing controller (not shown) mounted in the drive circuit board 430. The gate signals may be sequentially provided to the pixel line by line through the gate lines 102. In an exemplary embodiment, the gate drive unit 500 may be realized by an amorphous silicon gate ("ASG") method in which a gate drive unit is unitary with a non-display area NDA, for example. However, the method of realizing the gate drive unit 500 is not limited thereto. In an exemplary embodiment, the gate drive unit 500 may be realized by a tape carrier package ("TCP") method or a chip on glass ("COG") method, in which a gate drive unit is mounted in a flexible printed board, for example.

The first substrate 100 and the second substrate 200 may be attached to each other by a sealing member 250 including a sealant. The sealing member 250 may be disposed in the non-display area NDA of the first substrate 100 and the second substrate 200.

In exemplary embodiments, the shape of the display area DA in a plan view is a rectangular shape, and the non-display area NDA and the sealing member 250 disposed in the non-display area NDA, as shown in FIG. 1, may be realized in the shape of a rectangular band, for example. However, the shape of each of the display area DA, the non-display area NDA and the sealing member 250 is not limited thereto, and each of the display area DA, the non-display area NDA and the sealing member 250 may be realized in various shapes depending on the structure of the LCD device.

The liquid crystal layer 300 including liquid crystal molecules having positive dielectric anisotropy or negative dielectric anisotropy may be interposed between the first substrate 100 and the second substrate 200.

Next, the structures of the first substrate 100, the second substrate 200 and the pixel of the display device 10 according to an exemplary embodiment of the invention will be described in detail.

Referring to FIGS. 2 and 3, one pixel of the display device according to an exemplary embodiment of the invention may include two sub-pixel areas PX1 and PX2. Further, one pixel of the display device may include a gate line 102 for transferring gate signals, a data line 132 for transferring data signals, a partial reference line RL, a first TFT TR1, a second TFT TR2, and a third TFT TR3.

The first TFT TR1 and the second TFT TR2 may be connected to the corresponding gate line 102 and the corresponding data line 132. The third TFT TR3 may be connected to the gate line 102 corresponding to the first TFT TR1 and the second TFT TR2, the second TFT TR2, and the partial reference line RL.

A first liquid crystal condenser C1 connected with the first TFT TR1 is provided in the sub-pixel area PX1, and a second liquid crystal condenser C2 connected with the second TFT TR2 and the third TFT TR3 is provided in the sub-pixel area PX2.

The first terminal of the first TFT TR1 may be connected to the gate line 102, the second terminal of the first TFT TR1 may be connected to the data line 132, and the third terminal of the first TFT TR1 may be connected to the first liquid crystal condenser C1. Particularly, the third terminal of the first TFT TR1 may be connected to the first sub-pixel electrode 162-1 constituting the first liquid crystal condenser C1.

The first terminal of the second TFT TR2 may be connected to the gate line 102, the second terminal of the second TFT TR2 may be connected to the data line 132, and the third terminal of the second TFT TR2 may be connected to the second liquid crystal condenser C2. Particularly, the third terminal of the second TFT TR2 may be connected to the second sub-pixel electrode 162-2 constituting the second liquid crystal condenser C2.

The first terminal of the third TFT TR3 may be connected to the gate line 102, the second terminal of the third TFT TR3 may be connected to the partial reference line RL, and the third terminal of the third TFT TR3 may be connected to the third terminal of the second TFT TR2. A predetermined voltage may be applied to the second terminal of the third TFT TR3.

In an exemplary embodiment, each of the first substrate 100 and the second substrate 200 may include an insulating material, such as glass, quartz, ceramic, silicon, or transparent plastic, and this insulating material may be appropriately selected according to the need of those skilled in the art. The first substrate 100 and the second substrate 200 may face each other.

In exemplary embodiments, each of the first substrate 100 and the second substrate 200 may have flexibility. That is, each of the first substrate 100 and the second substrate 200 may be a substrate whose shape can be changed by rolling, folding, bending, or the like.

The gate lines 102 may be disposed on the first substrate 100. The gate lines 102 generally extend in a first direction (illustratively, X direction), and transfer gate signals.

A first gate electrode 104-1 and a second gate electrode 104-2 protruding from the gate line 102 and connected to each other may be disposed on the first substrate 100. In addition, a third gate electrode 104-3 protruding from the gate line 102 and spaced apart from the first gate electrode 104-1 and the second gate electrode 104-2 may be disposed on the first substrate 100. The first, second and third gate electrodes 104-1, 104-2 and 104-3 may be connected to the same gate line 102, and the same gate signal may be applied thereto.

In an exemplary embodiment, each of the gate line 102, the first gate electrode 104-1, the second gate electrode 104-2, and the third gate electrode 104-3 may include an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), tantalum (Ta), or titanium (Ti), for example. Each of the gate line 102, the first gate electrode 104-1, the second gate electrode 104-2, and the third gate electrode 104-3 may have a single-layer structure or may have a multi-layer structure including at least two conductive films having different physical properties. Among these conductive films, one conductive film may include a low-resistance metal, such as an aluminum-based metal, a silver-based metal, or a copper-based metal, for example, in order to reduce signal delay or voltage drop. In other exemplary embodiments, the conductive films may include a metal having excellent contact characteristics with different material, particularly, indium tin oxide ("ITO") and indium zinc oxide ("IZO"), such as a molybdenum-based metal, chromium, titanium, or tantalum. Examples of combinations of the conductive films may include a combination of a lower chromium film and an upper aluminum film and a combination of a lower aluminum film and an upper molybdenum film. However, the invention is not limited thereto, and each of the gate line 102, the first gate electrode 104-1, the second gate electrode 104-2, and the third gate electrode 104-3 may include various other metals and conductors.

A gate insulating film 112 may be disposed on the gate line 102 and the first, second and third gate electrodes 104-1, 104-2 and 104-3. In an exemplary embodiment, the gate insulating film 112 may include an inorganic insulating material, such as silicon oxide, silicon nitride, or silicon oxynitride. The gate insulating film 112 may have a single-layer structure or may have a multi-layer structure including at least two insulating layers having different physical properties.

A first semiconductor layer 122-1, a second semiconductor layer 122-2, and a third semiconductor layer 122-3 are disposed on the gate insulating film 112. The first semiconductor layer 122-1 may be disposed on the first gate electrode 104-1, the second semiconductor layer 122-2 may be disposed on the second gate electrode 104-2, and the third semiconductor layer 122-3 may be disposed on the third gate electrode 104-3. Although not shown in the drawings, a semiconductor pattern may further be disposed under the data line 132. In an exemplary embodiment, each of the first semiconductor layer 122-1, the second semiconductor layer 122-2, and the third semiconductor layer 122-3 may include amorphous silicon, polycrystalline silicon, or oxide semiconductor, for example.

A plurality of resistive contact members 124-1, 124-2, 124-3, 124-4, 124-5, and 124-6 may be disposed on the first semiconductor layer 122-1, the second semiconductor layer 122-2, and the third semiconductor layer 122-3. The plurality of resistive contact members 124-1, 124-2, 124-3, 124-4, 124-5, and 124-6 may include source resistive contact members 124-1, 124-2, and 124-3 disposed under first to third source electrodes 134-1, 134-2, and 134-3, which will be described later, and drain resistive contact member 124-4, 124-5, and 124-6 disposed under first to third drain electrode 136-1, 136-2, and 136-3, which will be described later. Further, although not shown in the drawings, the plurality of resistive contact members 124-1, 124-2, 124-3, 124-4, 124-5, and 124-6 may further include a data resistive contact member disposed under the data line 132. The data resistive contact member may be disposed between the data line 132 and the semiconductor pattern 122-4. In exemplary embodiments, each of the plurality of resistive contact members 124-1, 124-2, 124-3, 124-4, 124-5, and 124-6 may include hydrogenated amorphous silicon doped with n-type impurities at high concentration or may include silicide, for example. In exemplary embodiments, when each of the first semiconductor layer 122-1, the second semiconductor layer 122-2, and the third semiconductor layer 122-3 includes oxide semiconductor, the resistive contact members 124-1, 124-2, 124-3, 124-4, 124-5, 124-6 may be omitted.

The data line 132, the first source electrode 134-1, the first drain electrode 136-1, the second source electrode 134-2, the second drain electrode 136-2, the third source electrode 134-3, and the third drain electrode 136-3 may be disposed on the resistive contact members 124-1, 124-2, 124-3, 124-4, 124-5, and 124-6 and the gate insulating film 112.

The data lines 132 transfer data voltages, and extend in a second direction (illustratively, Y direction) to cross the gate lines 102. The gate lines 102 and the data lines 132 cross each other to define a plurality of pixel areas. The pixel area may be defined as an area surrounded by the gate line 102 and the data line 132.

The first source electrode 134-1 protrudes over the first gate electrode 104-1 from the data line 132. In exemplary embodiments, the first source electrode 134-1 may have a C-bent shape over the first gate electrode 104-1, but is not limited thereto.

The first drain electrode 136-1 may be spaced apart from the first source electrode 134-1 over the first gate electrode 104-1. A channel may be provided in the exposed portion between the first source electrode 134-1 and the first drain electrode 136-1 spaced apart from each other in the first semiconductor layer 122-1.

The second source electrode 134-2 protrudes over the second gate electrode 104-2 from the data line 132. In exemplary embodiments, the second source electrode 134-2 may have a C-bent shape over the second gate electrode 104-2, but is not limited thereto.

The second drain electrode 136-2 may be spaced apart from the second source electrode 134-2 over the second gate electrode 104-2. A channel may be provided in the exposed portion between the second source electrode 134-2 and the second drain electrode 136-2 spaced apart from each other in the second semiconductor layer 122-2. The second drain electrode 136-2 may include an extension portion that is widely extended.

The third source electrode 134-3 is connected with the second drain electrode 136-2, and may be spaced apart from the third drain electrode 136-3 over the third gate electrode 104-3. A channel may be provided in the exposed portion between the third source electrode 134-3 and the third drain electrode 136-3 spaced apart from each other in the third semiconductor layer 122-3.

The third drain electrode 136-3 may protrude over the third gate electrode 104-3. The third drain electrode 136-3 may be electrically connected with the partial reference line RL through a third contact hole CT3 to receive a predetermined voltage. In exemplary embodiments, the partial reference line RL may be disposed on the same level as the gate line 102.

At least a part of the partial reference line RL may be exposed through the third contact hole CT3. A part of the exposed partial reference line RL may be electrically connected with the third drain electrode 136-3 through a floating electrode 164 disposed in the third contact hole CT3.

In an exemplary embodiment, each of the data line 132, the first source electrode 134-1, the first drain electrode 136-1, the second source electrode 134-2, the second drain electrode 136-1, the third source electrode 134-3, and the third drain electrode 136-3 may include aluminum, copper, silver, molybdenum, chromium, titanium, tantalum, or an alloy thereof, and may have a multi-layer structure including a lower film (not shown) including a refractory metal and a low-resistance upper film (not shown) disposed thereon, for example, but is not limited thereto.

The aforementioned first gate electrode 104-1, first semiconductor layer 122-1, first source electrode 134-1 and first drain electrode 136-1 may constitute the first TFT TR1. Further, the aforementioned second gate electrode 104-2, second semiconductor layer 122-2, second source electrode 134-2 and second drain electrode 136-2 may constitute the second TFT TR2, and the aforementioned third gate electrode 104-3, third semiconductor layer 122-3, third source electrode 134-3 and third drain electrode 136-3 may constitute the third TFT TR3.

A first protection layer 142 may be disposed on the data line 132, the first to third source electrodes 134-1, 134-2, and 134-3, and the first to third drain electrodes 136-1, 136-2, and 136-3. In an exemplary embodiment, the first protection layer 142 may include an organic insulating material or an inorganic insulating material, such as silicon oxide, silicon nitride, or silicon oxynitride.

A color filter 152 may be disposed on the first protection layer 142. In an exemplary embodiment, the color filter 152 may include a red color filter, a green color filter, and a blue color filter. Each of the red, green, and blue color filter is provided in one pixel to form an R, G, or B pixel. However, the invention is not limited thereto, and the color filter may include various other colors.

The color filter 152 may overlap the pixel electrodes 162-1 and 162-2. In an exemplary embodiment, the color filter 152 may include a photosensitive organic material including a pigment. In exemplary embodiments, an organic layer is disposed on the color filter 152 to planarize the level differences of the red, green, and blue color filters. The organic layer is excellent in planarization characteristics, and may include a photosensitive material. The color filter 152 may be disposed over the entire display area DA other than the first contact hole CT1, the second contact hole CT2, and the third contact hole CT3, but is not limited to such as structure.

The pixel electrodes 162-1 and 162-2 may be disposed on the color filter 152 for each unit pixel. In exemplary embodiments, the pixel electrodes 162-1 and 162-2 may include a first sub-pixel electrode 162-1 and a second sub-pixel electrode 162-2. In a plan view, the first sub-pixel electrode 162-1 and the second sub-pixel electrode 162-2 may be arranged in the second direction (or Y direction) with the gate line therebetween. That is, the first sub-pixel electrode 162-1 may be disposed over the gate line 102 in the second direction (or Y direction), and the second sub-pixel electrode 162-2 may be disposed under the gate line 102 in the second direction (or Y direction).

The first sub-pixel electrode 162-1 may be connected with the first drain electrode 136-1 through the first contact hole CT1, and the second sub-pixel electrode 162-2 may be connected with the second drain electrode 136-2 through the second contact hole CT2.

The first sub-pixel electrode 162-1 and the second sub-pixel electrode 162-2 receive data voltages from the first drain electrode 136-1 and the second drain electrode 136-2, respectively. In this case, a part of the data voltage applied to the second drain electrode 136-2 is divided by the third source electrode 134-3, and thus the size of the second sub-pixel voltage applied to the second sub-pixel electrode 162-2 becomes smaller than the size of the first sub-pixel voltage applied to the first sub-pixel electrode 162-1. This case is applied when the data voltage applied to each of the first sub-pixel electrode 162-1 and the second sub-pixel electrode 162-2 is positive (+). In contrast, when the data voltage applied to each of the first sub-pixel electrode 162-1 and the second sub-pixel electrode 162-2 is negative (−), the size of the first sub-pixel voltage applied to the first sub-pixel electrode 162-1 becomes smaller than the size of the second sub-pixel voltage applied to the second sub-pixel electrode 162-2.

The first sub-pixel electrode 162-1 includes a first stem 162-1a and a plurality of first branches 162-1b radially protruding and extending from the first stem 162-1a. The first stem 162-1a may be provided in various shapes. Illustratively, as shown in FIG. 3, the first stem 162-1a may have a cross shape. In this case, the first sub-pixel may be divided into four domains by the first stem 162-1a.

The first branches 162-1b correspond to each domain, and may extend in different directions from each other for each domain. The first branches 162-1b extend in parallel to each other in each of the domains divided by the first stem 162-1a, and are spaced apart from each other. The first braches 162-1b adjacent to each other is spaced apart from each other by a distance of micrometers to form a plurality of fine slits.

In an exemplary embodiment, the first sub-pixel electrode 162-1 may include a transparent conductive material. In an exemplary embodiment, the first sub-pixel electrode 162-1 may include a transparent conductive material, such as ITO, IZO, indium tin zinc oxide ("ITZO"), or aluminum doped zinc oxide ("AZO").

The liquid crystal molecules of the liquid crystal layer 300 overlapping the first sub-pixel electrode 162-1 are pretilt for each domain in different directions from each other by the plurality of fine slits. In an exemplary embodiment, the tilt directions of liquid crystal molecules may be four directions toward the first stem 162-1a. Therefore, four domains in which the alignment directions of liquid crystal molecules are different from each other are provided in the liquid crystal layer 300. As such, when the tilt directions of liquid crystal molecules become various, the reference viewing angle of the display device 10 may be increased.

The second sub-pixel electrode 162-2 includes a second stem 162-2a and a plurality of second branches 162-2b radially protruding and extending from the second stem 162-2a. That is, the second sub-pixel electrode 162-2 may have the substantially same configuration as the first sub-pixel electrode 162-1. Therefore, a detailed description of the second sub-pixel electrode 162-2 will be omitted.

In a plan view, the area of the second sub-pixel electrode 162-2 may be larger than the area of the first sub-pixel electrode 162-1.

Light-blocking layers 172 and 174 may be disposed over the pixel electrodes 162-1 and 162-2. The light-blocking layers 172 and 174 serve to prevent light leakage. The light-blocking layers 172 and 174 may be disposed over the first to third TFTs TR1, TR2, and TR3, non-pixel areas (area between pixels, gate line area and/or data line area), and the non-display area NDA.

In exemplary embodiments, the light-blocking layers 172 and 174 may directly contact a part of the first sub-pixel electrode 162-1, a part of the second sub-pixel electrode 162-2, and a part of the color filter 152. At least a part of each of the light-blocking layers 172 and 174 may fill the first contact hole CT1, the second contact hole CT2, and the third contact hole CT3. However, this is an exemplary embodiment, and the configuration of the invention is not limited thereto.

In an exemplary embodiment, the light-blocking layers 172 and 174 may include a black organic polymer material including a black dye or pigment, or may include a metal (metal oxide), such as chromium (chromium oxide).

The light-blocking layers 172 and 174 may include a first light-blocking layer 172 and a second light-blocking layer 174. The first light-blocking layer 172 may be disposed in the non-display area NDA, and the second light-blocking layer 174 may disposed in the display area DA. Referring to FIG. 3, the second light-blocking layer 174 is disposed in the display area DA, but may also be disposed in the non-pixel area, that is, a gate line area 112 and/or a data line area 142. The first light-blocking layer 172 may be disposed outside the second light-blocking layer 174.

The structure of the second light-blocking layer 174 will be described as follows.

Referring to FIG. 3, in exemplary embodiments, the second light-blocking layer 174 may be disposed over the first to third TFTs TR1, TR2, and TR3, the gate line 102, and the data line 132. However, this is an exemplary embodiment, and the structure of the second light-blocking layer 174 is not limited thereto.

A column spacer 176 serves to maintain the interval between the first substrate 100 and the second substrate 200. In exemplary embodiments, the end of the column spacer 176, as shown in FIG. 3, may contact the side of the second substrate 200. However, this is an exemplary embodiment, and the end of the column spacer 176 may be spaced apart from the second substrate 200 by a predetermined distance.

Although not shown in the drawings, the column spacer 176 may be realized to include a plurality of column spacers having level differences. In an exemplary embodiment, the column spacer 176 may include a main column spacer having a relatively high level difference and a sub-column spacer having a relatively low level difference. In this case, the interval between the first substrate 100 and the second substrate 200 may be primarily maintained by the main column spacer, and may be secondarily maintained by the sub-column spacer when the main column spacer cannot exhibit the function.

Referring to FIG. 4, the column spacer 176 may be disposed on the second light-blocking layer 174. The column spacer 176 may be disposed in the area corresponding to the TFT. In the embodiment of FIG. 4, a case that the column spacer overlap the first TFT TR1 has been illustrated, but the invention is not limited thereto. In exemplary embodiments, the column spacer 176 may include a light-blocking pigment, and may include the same material as that of the light-blocking layer 172 or 174. In exemplary embodiments, the column spacer 176 may be unitary with the light-blocking layer 172 or 174, and may be provided together with the light-blocking layer 172 or 174 by a single photolithography process using a slit mask or a halftone mask, for example.

A common electrode 212 may be disposed on the second substrate 200. The common electrode 212 receives a common voltage to form an electric field together with the pixel electrodes 162-1 and 162-2, thereby controlling the alignment direction of liquid crystal molecules included in the liquid crystal layer 300.

The common electrode 212 may be integrally provided over the entire pixel area surrounded by the gate lines 102 and the data lines 132. In an exemplary embodiment, the common electrode 212 may include a transparent conductive material, such as ITO or IZO, but the invention is not limited thereto.

Although not shown in the drawings, one side of the first substrate 100 and one side of the second substrate 200, which face the liquid crystal layer 300, may be provided with alignment films, respectively. That is, alignment films capable of aligning the liquid crystal molecules of the liquid crystal layer 300 may be disposed on the pixel electrodes 162-1 and 162-2, the light-blocking layers 172 and 174, and the column spacer 176. In an exemplary embodiment, the alignment film may include a resin polymer, such as polyimide, polyamic acid, polyamide, polyamic imide, polyester, polyethylene, polyurethane, or polystyrene, or a combination thereof. In an exemplary embodiment, the alignment film may include the monomers of the above resin polymer, for example.

Generally, in the manufacturing of the display device, a process of forming a light-blocking layer over the entire non-display area NDA and display area DA and patterning the light-blocking layer using a developer is carried out. In this case, the fatigue of the developer in the display area DA is higher than the fatigue of the developer in the non-display area NDA. The reason for this is that a relatively large amount of the light-blocking layer is developed at the center of the display area DA compared to the non-display area NDA. Therefore, the light-blocking layer may be relatively overdeveloped at the periphery of the display area DA compared to at the center of the display area DA, due to the influence of the developer applied to the non-display area NDA. When the light-blocking layer is overdeveloped in this way, the light-blocking layer cannot be secured as need, thus causing a light leakage phenomenon.

In order to prevent the light leakage phenomenon occurring when the light-blocking layer located at the periphery of the display area DA is overdeveloped, an opening portion 172a at least partially penetrating the first light-blocking layer 172 and the second light-blocking layer 174 may be defined in the display device 10 according to an exemplary embodiment of the invention. That is, the display device 10 may be configured such that a larger amount of the light-blocking layer is developed around the boundary of the non-display area ("NDA") to increase the fatigue of the developer, and thus the developer of the non-display area NDA permeates the light-blocking layer of the display area DA, so as to prevent the light-blocking layer from being overdeveloped. Further, when the light-blocking layer having the above structure is employed, liquid crystals may be stably injected over the entire display device 10.

Figure 5:
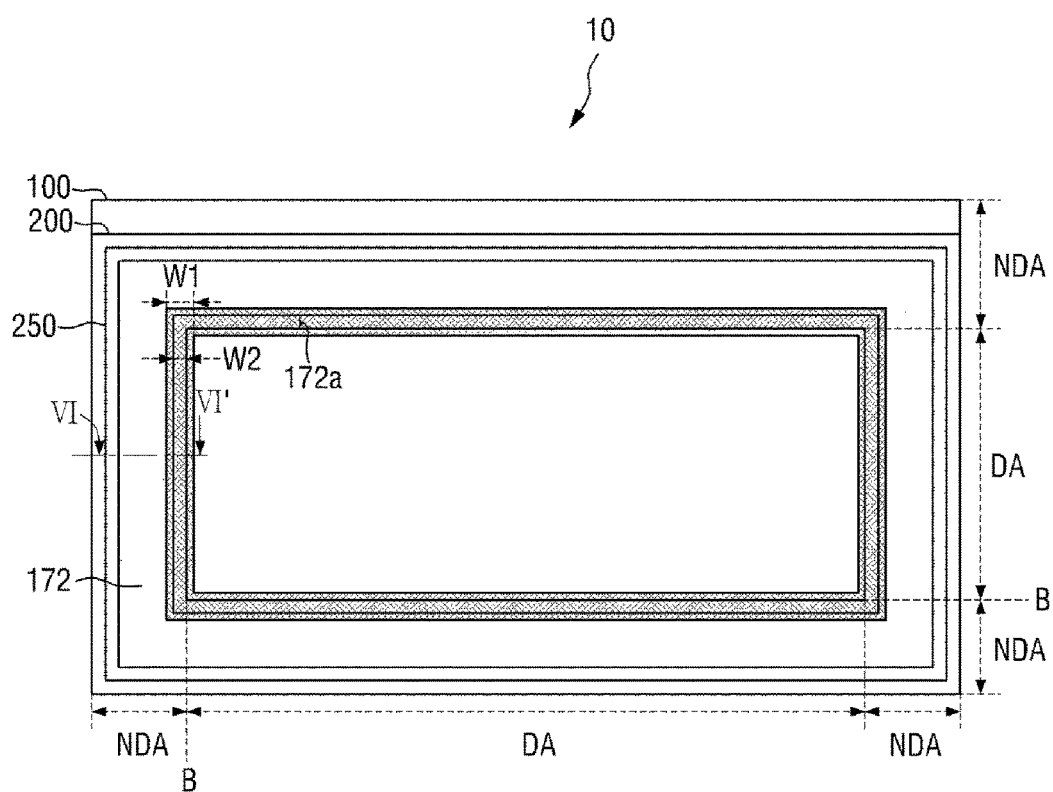
FIG. 5 is a plan view for explaining an exemplary embodiment of the structure of the non-display area of an LCD device according to the invention.
Figure 6:
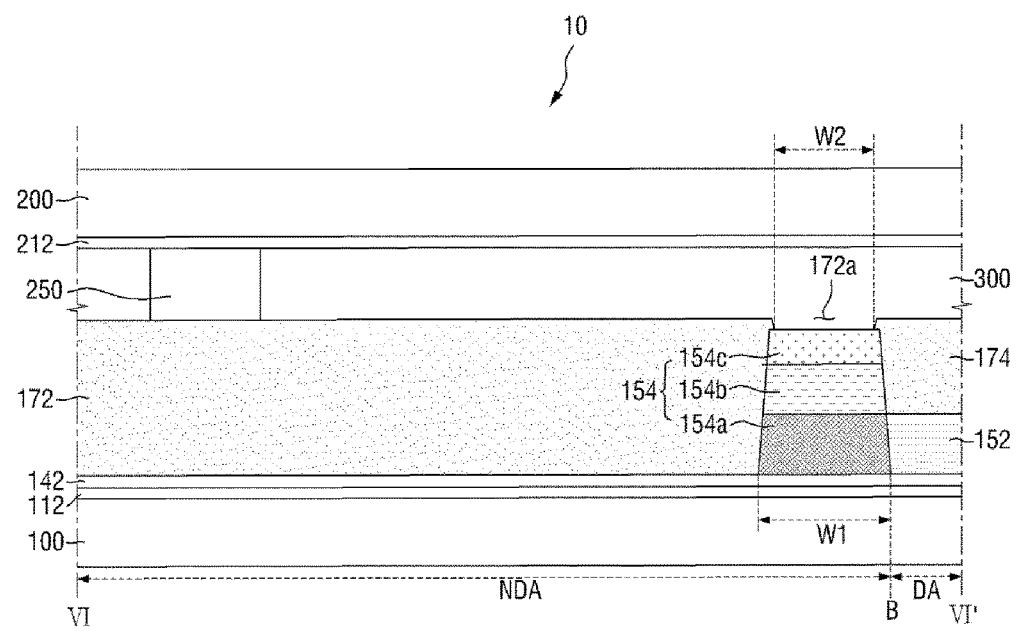
FIG. 6 is a cross-sectional view taken along line VI-VI' of FIG. 5.

FIG. 5 is a plan view for explaining the structure of the non-display area of an LCD device according to an exemplary embodiment of the invention. FIG. 6 is a cross-sectional view taken along line VI-VI' of FIG. 5.

Referring to FIGS. 5 and 6, an opening portion 172a at least partially penetrating the first light-blocking layer 172 and the second light-blocking layer 174 may be defined in the display device 10 according to an exemplary embodiment of the invention.

The first light-blocking layer 172 is disposed in the non-display area NDA, but may be disposed adjacent to the boundary B between the non-display area NDA and the display area DA. The first light-blocking layer 172 may at least partially overlap a dummy color layer 154 to be described later.

The first light-blocking layer 172 may include the substantially same material as that of the second light-blocking layer 174 disposed in the display area DA. However, the material of the first light-blocking layer 172 is not limited thereto.

The opening portion 172a is defined in the non-display area NDA, but may be disposed adjacent to the boundary B between the non-display area NDA and the display area DA. The opening portion 172a may at least partially penetrate the first light-blocking layer 172. In an exemplary embodiment, the opening portion 172a penetrates the first light-blocking layer 172 to at least partially expose the upper surface of the dummy color layer DC.

The opening portion 172a may be defined between the first light-blocking layer 172 and the second light-blocking layer 174. Thus, the first light-blocking layer 172 and the second light-blocking layer 174 may be spaced apart from each other with the opening portion 172a therebetween.

In exemplary embodiments, the non-display area NDA may be disposed along the outer periphery of the display area DA. Specifically, the non-display area NDA may be disposed along the outer periphery of the display area DA to have a closed band shape.

The opening portion 172a may also be disposed along the outer periphery of the display area DA to have a closed band shape.

In an exemplary embodiment, the shape of the display area DA in a plan view may be a rectangular shape, and the shape of each of the non-display area NDA and the opening portion 172a in a plan view may be a closed rectangular band shape, for example. As such, when the opening portion 172a has a closed band shape, the first light-blocking layer 172 and the second light-blocking layer 174 may be separated from each other by the opening portion 172a. In other words, the first light-blocking layer 172 and the second light-blocking layer 174 may be spaced apart from each other with the opening portion 172a therebetween. However, this is an exemplary embodiment, and the structure of the opening portion 172a is not limited thereto.

The display device 10 according to an exemplary embodiment of the invention includes a dummy color layer 154 disposed in the non-display area NDA as a structure for preventing light leakage.

The dummy color layer 154 is disposed in the non-display area NDA, but may be disposed adjacent to the boundary B between the non-display area NDA and the display area DA.

The distribution density of the dummy color layer 154 and/or the first light-blocking layer 172 may be changed from the boundary to the outside of the non-display area NDA. Detailed descriptions thereof will be explained with reference to FIG. 12 and the following drawings.

In exemplary embodiments, the width W1 of the dummy color layer 154 may be larger than the width W2 of the opening portion 172a. The opening portion 172a may be disposed in the inner area of the dummy color layer 154. That is, the upper surface of the dummy color layer 154 may be exposed by the opening portion 172a. However, this is an exemplary embodiment, and the width W1 of the dummy color layer 154 may also be substantially equal to the width W2 of the opening portion 172a.

In exemplary embodiments, the upper surface of the dummy color layer 154, exposed by the opening portion 172a, may have a closed band shape in a plan view. However, this is an exemplary embodiment, and the shape of the upper surface thereof is not limited thereto.

In exemplary embodiments, the width W1 of the dummy color layer 154 may be constant, and the width W2 of the opening portion 172a may also be constant. However, this is an exemplary embodiment, and the widths thereof are not limited thereto.

In exemplary embodiments, the dummy color layer 154 may have a multi-layer structure. In an exemplary embodiment, as shown in FIG. 6, the dummy color layer 154 may have a multi-layer structure in which a first dummy color layer 154a, a second dummy color layer 154b, and a third dummy color layer 154c are sequentially laminated. In this case, the first dummy color layer 154a may be disposed in the same layer as the color filter 152. In an exemplary embodiment, the first dummy color layer 154a, the second dummy color layer 154b, and the third dummy color layer 154c may have different colors, respectively. In an exemplary embodiment, at least one of the colors may be blue, for example. In an exemplary embodiment, the first dummy color layer 154a may be red, the second dummy color layer 154b may be green, and the third dummy color layer 154c may be blue, for example. However, this is not limited to this combination of colors.

In exemplary embodiments, the first dummy color layer 154a, the second dummy color layer 154b, and the third dummy color layer 154c may have different thicknesses from one another. In an exemplary embodiment, as shown in FIG. 6, the thickness of the upper layer may become smaller. That is, the thickness thereof may decrease in order of the first dummy color layer 154a, the second dummy color layer 154b, and the third dummy color layer 154c. However, this is an exemplary embodiment, and the thicknesses thereof are not limited thereto.

In exemplary embodiments, the dummy color layer 154 may be disposed within about 0.8 millimeter (mm) from the boundary B between the display area DA and the non-display area NDA, for example. However, this numerical value is illustrative, and is not limited thereto.

In exemplary embodiments, the first light-blocking layer 172 may be disposed without regard to the lower metal layer disposed on the first substrate 100, but, in another exemplary embodiment, a stepped portion may be defined in the first light-blocking layer 172 in an area overlapping the lower metal layer.

Figure 7:
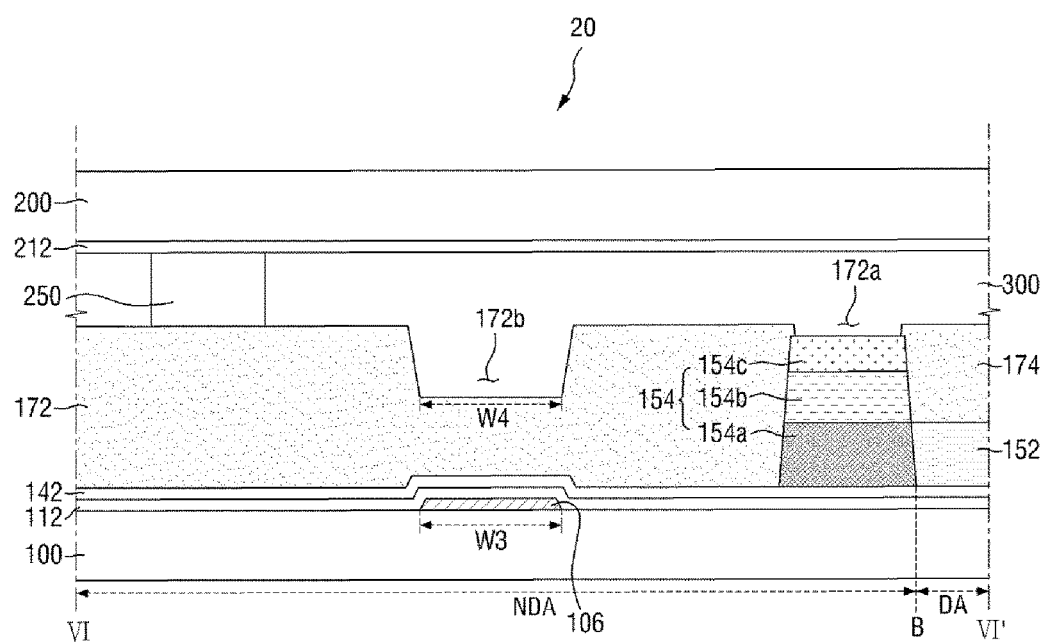
FIG. 7 is a cross-sectional view taken along line VI-VI' of FIG. 5 of another exemplary embodiment of an LCD device according to the invention.

FIG. 7 is a cross-sectional view taken along line VI-VI' of FIG. 5 of an LCD device according to another exemplary embodiment of the invention.

Referring to FIG. 7, the display device 20 according to another exemplary embodiment of the invention is the same as or similar to the display device 10 described with reference to FIGS. 1 to 6, except for a stepped portion 172b defined in the first light-blocking layer 172 overlapping the lower metal layer 106. Hereinafter, differences, except for redundancy, will be described.

In the embodiment of FIG. 7, a concave stepped portion 172b overlapping the lower metal layer 106 is defined in the first light-blocking layer 172. That is, the stepped portion 172b may have a shape recessed to a predetermined depth from the peripheral surface of the first light-blocking layer 172. In an exemplary embodiment, the stepped portion 172b may be defined by a photolithography process using a slit mask or a halftone mask, for example. In an exemplary embodiment, the stepped portion 172b may be defined together with the opening portion 172a by a single photolithography process, for example.

In exemplary embodiments, the lower metal layer 106 may be a signal wire or a circuit wire, but is not limited thereto. In an exemplary embodiment, the lower metal layer 106 may be an island-shaped dummy metal layer.

In exemplary embodiments, the lower metal layer 106 may be disposed in the same layer as the gate line 102, but is not limited thereto. The lower metal layer 106 may be disposed in the same layer as the data line 132 (refer to FIG. 3) or may be disposed in the different layer from the gate line 102 and the data line 132.

In exemplary embodiments, the width W3 of the lower metal layer 106 may be substantially equal to the width W4 of the stepped portion 172b. However, this is an exemplary embodiment, and the width W3 of the lower metal layer 106 may be larger than the width W4 of the stepped portion 172b.

Since the opening portion 172a and the stepped portion 172b are defined in the display device 20 according to another exemplary embodiment of the invention, the rapid change in the density of the light-blocking layer at the boundary B between the display area DA and the non-display area NDA may be reduced, and thus it is possible to prevent the light-blocking layer located at the edge of the display area DA from being overdeveloped in the process of forming the light-blocking layer.

Figure 8:
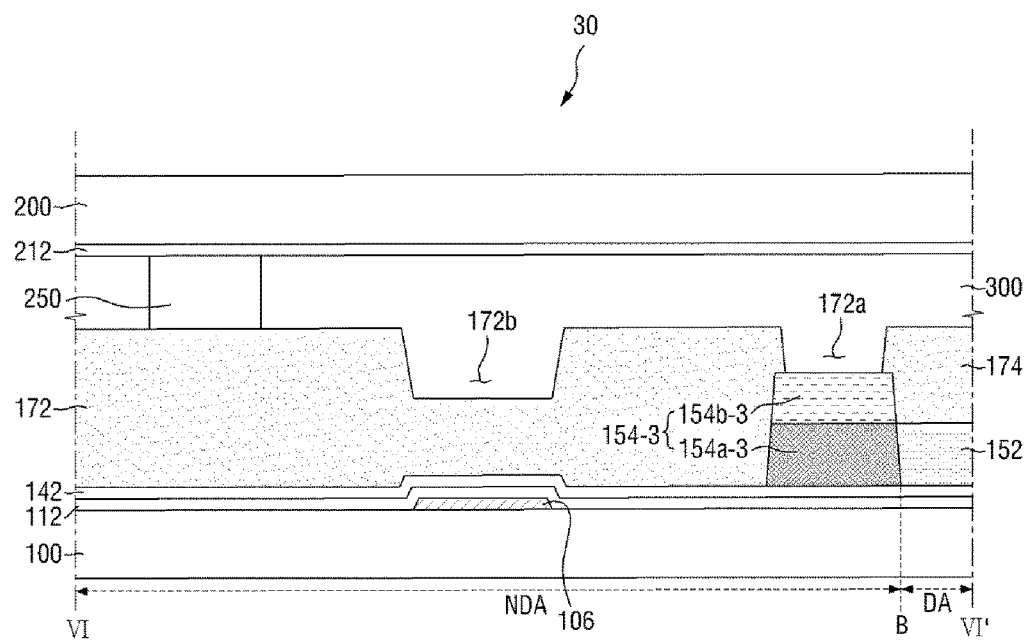
FIGS. 8 and 9 show cross-sectional views taken along the lines corresponding to the line VI-VI' of FIG. 5 of another exemplary embodiment of an LCD device according to the invention.

FIG. 8 is a cross-sectional view taken along line VI-VI' of FIG. 5 of an LCD device according to another exemplary embodiment of the invention.

Referring to FIG. 8, the display device 30 according to another exemplary embodiment of the invention is the same as or similar to the display device 20 described with reference to FIG. 7, except for a dummy color layer 154-3. Hereinafter, differences, except for redundancy, will be described.

In the illustrated exemplary embodiment, the dummy color layer 154-3 may have a multi-layer structure in which a first dummy color layer 154a-3 and a second dummy color layer 154b-3 are sequentially laminated. The first dummy color layer 154a-3 and the second dummy color layer 154b-3 may have different colors, respectively. In an exemplary embodiment, at least one of the colors may be blue, for example. In an exemplary embodiment, the first dummy color layer 154a-3 may be red and the second dummy color layer 154b-3 may be blue, or the first dummy color layer 154a-3 may be green and the second dummy color layer 154b-3 may be blue, for example. However, this is not limited to these combinations of colors.

In exemplary embodiments, the first dummy color layer 154a-3 and the second dummy color layer 154b-3 may have different thicknesses. In an exemplary embodiment, as shown in FIG. 8, the thickness of the upper layer may become smaller. That is, the thickness of the first dummy color layer 154a-3 may be larger than the thickness of the second dummy color layer 154b-3. However, this is an exemplary embodiment, and the thicknesses thereof are not limited thereto.

Figure 9:
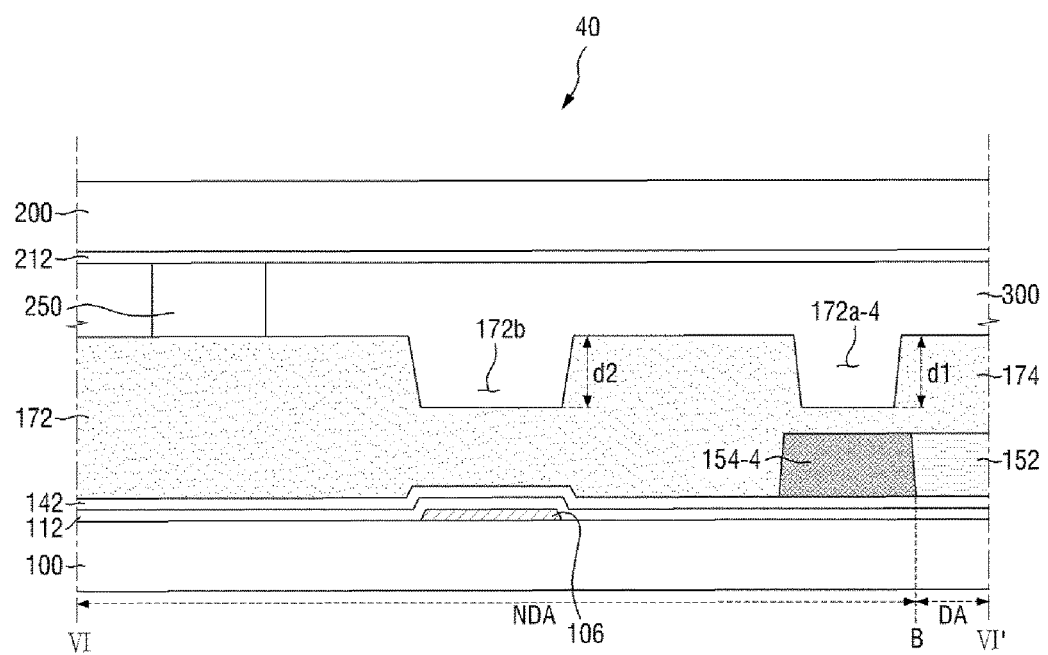

FIG. 9 is a cross-sectional view taken along line VI-VI' of FIG. 5 of an LCD device according to another exemplary embodiment of the invention.

Referring to FIG. 9, the display device 40 according to another exemplary embodiment of the invention is the same as or similar to the display device 20 described with reference to FIG. 7, except for a first stepped portion 172a-4 and a dummy color layer 154-4 provided in the light-blocking layer 172. Hereinafter, differences, except for redundancy, will be described.

In the illustrated exemplary embodiment, a concave first stepped portion 172a-4 and a concave second stepped portion 172b are defined in the first light-blocking layer 172. That is, each of the first stepped portion 172a-4 and the concave second stepped portion 172b may have a shape recessed to a predetermined depth from the peripheral surface of the first light-blocking layer 172.

The first stepped portion 172a-4 may be adjacent to the boundary B of the display area DA. That is, the first stepped portion 172a-4 may be disposed between the first light-blocking layer 172 and the second light-blocking layer 174. The first light-blocking layer 172 and the second light-blocking layer 174 may be unitary.

In exemplary embodiments, the non-display area NDA may be disposed along the outer periphery of the display area DA. In this case, the non-display area NDA may be disposed along the outer periphery of the display area DA to have a closed band shape. The first stepped portion 172a-4 may also be disposed along the outer periphery of the display area DA to have a closed band shape. In an exemplary embodiment, the shape of the display area DA in a plan view may be a rectangular shape, and the shape of each of the non-display area NDA and the first stepped portion 172a-4 in a plan view may be a closed rectangular band shape. The display device 40 according to another exemplary embodiment of the invention includes a dummy color layer 154-4 overlapping the first stepped portion 172a-4 as a structure for preventing light leakage through the first stepped portion 172a-4. The surface of the dummy color layer 154-4 may be covered by the first stepped portion 172a-4 not to be exposed. A description of the relationship of relative position and width between the dummy color layer 154-4 and the first stepped portion 172a-4 may be substantially the same as the description of the relationship of relative position and width between the dummy color layer 154 and the opening portion 172a, which has been described with reference to FIGS. 5 and 6.

The dummy color layer 154-4 may be configured as a single layer. In an exemplary embodiment, the dummy color layer 154-4 may be configured as a blue layer, for example. The dummy color layer 154-4 may be disposed in the same layer as the color filter 152. However, this is an exemplary embodiment, and the dummy color layer 154-4 may be configured as a single layer having a different color, and may also be configured as a multi-layer of two or more layers.

The second stepped portion 172b may be substantially the same as the stepped portion 172b (refer to FIG. 7) of the display device 20 according to another exemplary embodiment of the invention.

In an exemplary embodiment, the first stepped portion 172a-4 and the second stepped portion 172b may be provided by a photolithography process using a slit mask or a halftone mask, for example. In an exemplary embodiment, the first stepped portion 172a-4 and the second stepped portion 172b may be provided by a single photolithography process, for example.

In exemplary embodiments, the depth d1 of the first stepped portion 172a-4 may be substantially equal to the width d2 of the second stepped portion 172b. However, this is an exemplary embodiment, and the depth relationship between the first stepped portion 172a-4 and the second stepped portion 172b is not limited thereto.

Since the display device 40 according to another exemplary embodiment of the invention includes the first stepped portion 172a-4 and the second stepped portion 172b, the rapid change in the density of the light-blocking layer at the boundary B between the display area DA and the non-display area NDA may be reduced, and thus it is possible to prevent the light-blocking layer located at the edge of the display area DA from being overdeveloped in the process of forming the light-blocking layer.

Figure 10:
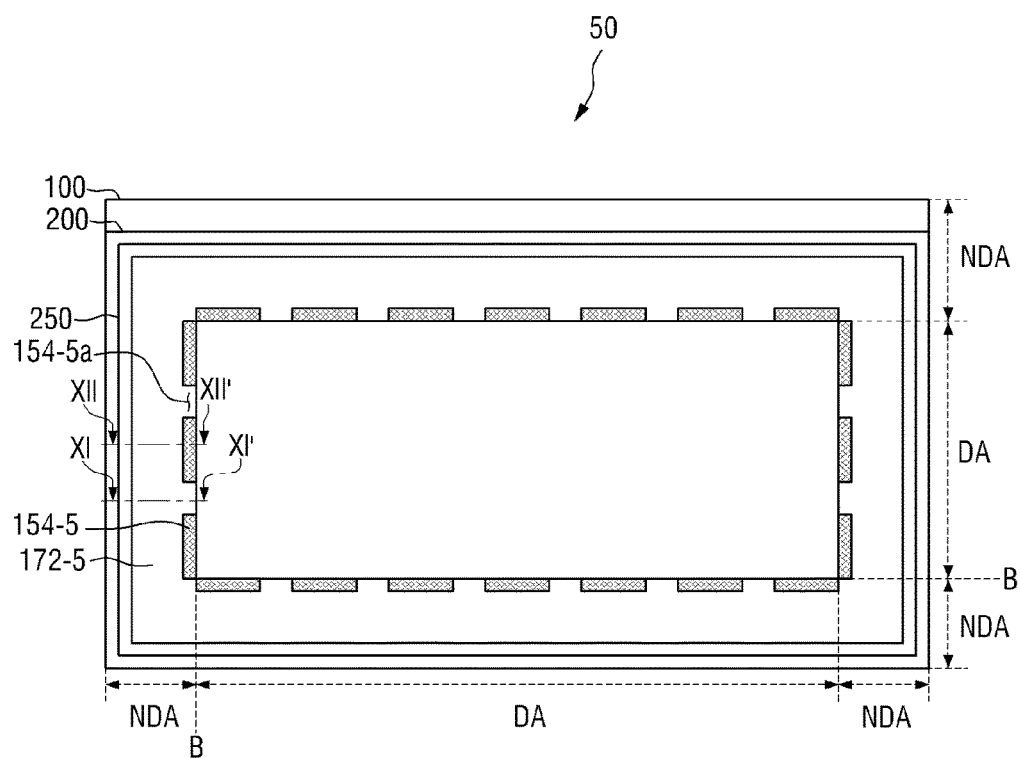
FIG. 10 is a plan view for explaining another exemplary embodiment of the structure of the non-display area of an LCD device according to the invention.
Figure 11:
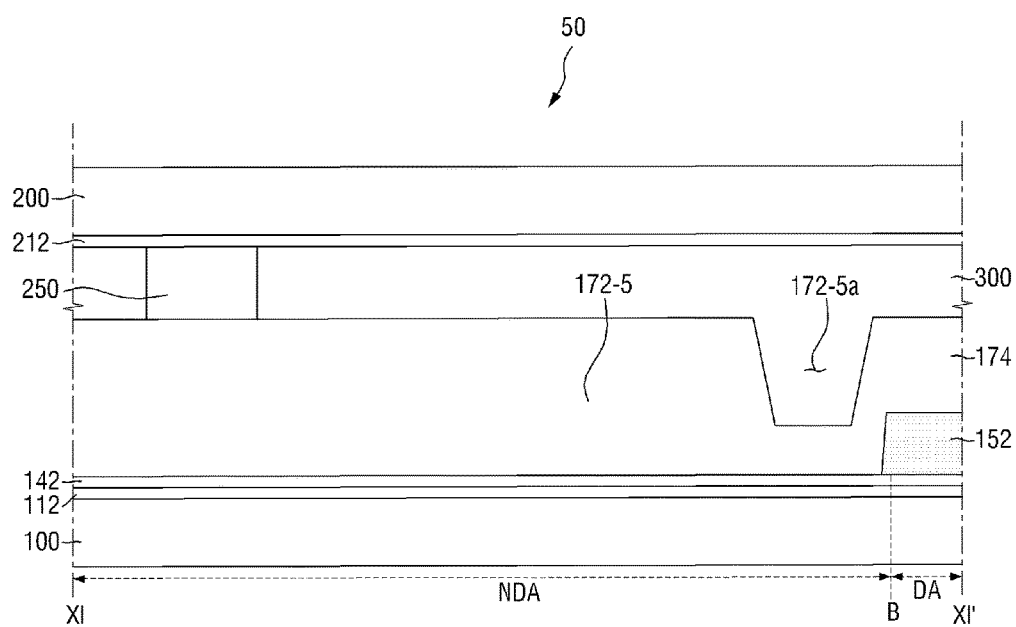
FIG. 11 is a cross-sectional view taken along line XI-XI' of FIG. 10.

FIG. 10 is a plan view for explaining the structure of the non-display area of the LCD device according to another exemplary embodiment of the invention. FIG. 11 is a cross-sectional view taken along line XI-XI' of FIG. 10. The cross-sectional view taken along line XII-XII' of FIG. 10 may be substantially the same as the cross-sectional view of FIG. 6.

Referring to FIGS. 10 and 11, the display device 50 according to another exemplary embodiment of the invention is the same as or similar to the display device 10 described with reference to FIGS. 1 to 6, except for a dummy color layer 154-5 and a first light-blocking layer 172-5. Hereinafter, differences, except for redundancy, will be described.

In exemplary embodiments, the non-display area NDA may be disposed along the outer periphery of the display area DA. In this case, the non-display area NDA may be disposed along the outer periphery of the display area DA to have a closed band shape.

The dummy color layer 154-5 is disposed in the non-display area NDA. The dummy color layer 154-5 is disposed adjacent to the boundary B between the non-display area NDA and the display area DA. The dummy color layer 154-5 is disposed along the outer periphery of the non-display area NDA, but may include disconnected portions. In an exemplary embodiment, as shown in FIG. 10, the dummy color layer 154-5 is disposed along the outer periphery of the non-display area NDA, but may include disconnected portions 154-5a, for example. Therefore, the opening portion 172-5a is also defined along the outer periphery of the non-display area NDA, but may include disconnected portions 154-5a. Accordingly, as shown in FIG. 11, the first light-blocking layer 172-5 and the second light-blocking layer 174 may be connected with each other. That is, the first light-blocking layer 172-5 and the second light-blocking layer 174 may be unitary.

For the convenience of explanation, terms are defined. In the specification, the term "distribution density" may mean an area ratio of a target component per unit area or a volume ratio of a target component per unit volume. The term "distribution density" may also mean the number of target components per unit area. In exemplary embodiments, the distribution density of a dummy color layer at planar time point may be decreased to the outside of the non-display area NDA from the boundary B between the display area DA and the non-display area NDA. In other words, a dummy color layer DC may have a section in which the distribution density thereof at planar time point may be decreased to the outside of the non-display area NDA from the boundary B. Therefore, the first light-blocking layer may include a region/section in which the distribution density thereof at planar time point may be gradually increased from the boundary B to the outside of the non-display area NDA, corresponding to the dummy color layer DC having a section in which the distribution density thereof at planar time point may be decreased from the boundary B to the outside of the non-display area NDA. In other words, the first light-blocking layer BM may include a section in which the distribution density thereof may be increased from the boundary B to the outside of the non-display area NDA.

In an exemplary embodiment, the section of the first light-blocking layer BM may at least partially overlap the section of the dummy color layer DC. In other words, as the distribution density of the first light-blocking layer BM is increased from the boundary B to the outside of the non-display area NDA, the distribution density of the dummy color layer DC may be complementarily decreased from the boundary B to the outside of the non-display area NDA.

The distribution density of the opening portion 172a may be changed depending on the change in the distribution density of the first light-blocking layer BM and/or the dummy color layer DC. Specifically, the distribution density of the opening portion 172a may be decreased as the distribution density of the dummy color layer DC is decreased from the boundary B to the outside of the non-display area NDA. In other words, the opening portion 172a may include a section in which the distribution density thereof is decreased the boundary B to the outside of the non-display area NDA from. In an exemplary embodiment, the section of the opening portion 172a may at least partially overlap the section of the dummy color layer DC.

FIGS. 12 to 17 are views showing the distributions of a dummy color layer and a light-blocking layer in a plan view in the non-display area of the LCD device according to another exemplary embodiment of the invention.

Figure 12:
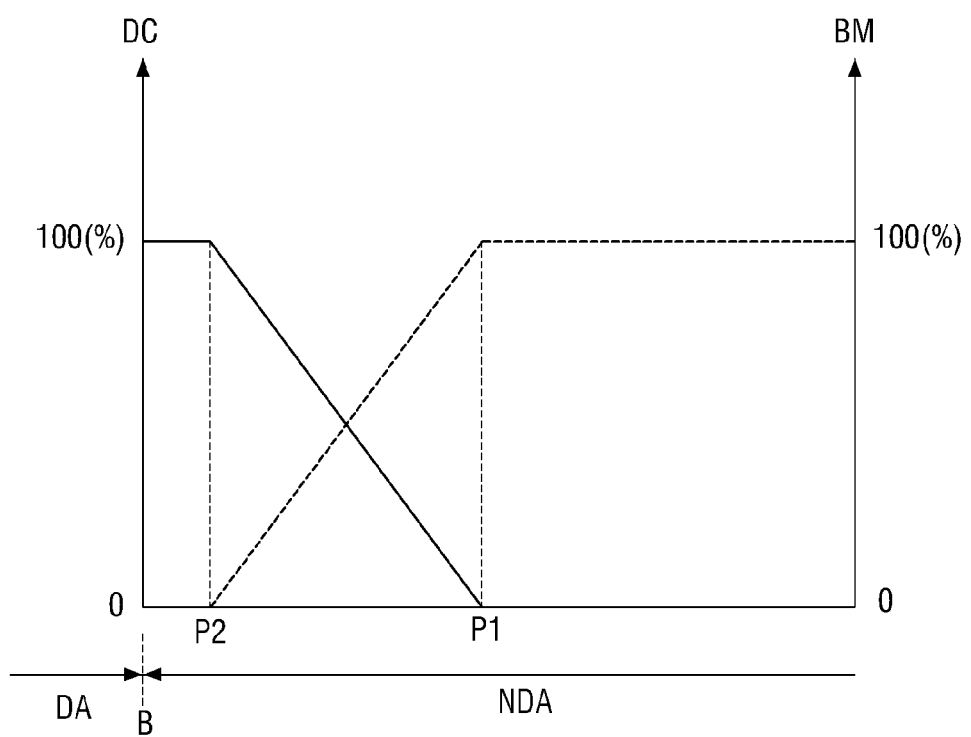
FIGS. 12 to 17 are views showing another exemplary embodiment of the distributions of a dummy color layer and a light-blocking layer in a plan view in the non-display area of the LCD device according to the invention.

Referring to FIG. 12, in exemplary embodiments, only the dummy color layer DC may be disposed from the boundary B between the display area DA and the non-display area NDA to the second point P2 in the non-display area NDA. That is, the light-blocking area BM may not be disposed from the boundary B between the display area DA and the non-display area NDA to the second point P2 when viewed from plane because the first light-blocking area BM includes the opening portion.

The distribution density of the dummy color layer DC is gradually decreased from the second point P2 to the first point P1, that is, from the second point P2 to the outside of the display area DA, and thus the distribution density thereof may become substantially 0 at the first point P1 in the non-display area NDA. The first point P1, compared to the second point P2, is relatively adjacent to the outside of the non-display area NDA. Therefore, the distribution density of the first light-blocking area BM may be gradually increased as the distribution density of the dummy color layer DC is gradually decreased from the second point P2 to the first point P1, and only the first light-blocking area BM may be substantially disposed from the first point P1 to the outside of the non-display area NDA.

Figure 13:
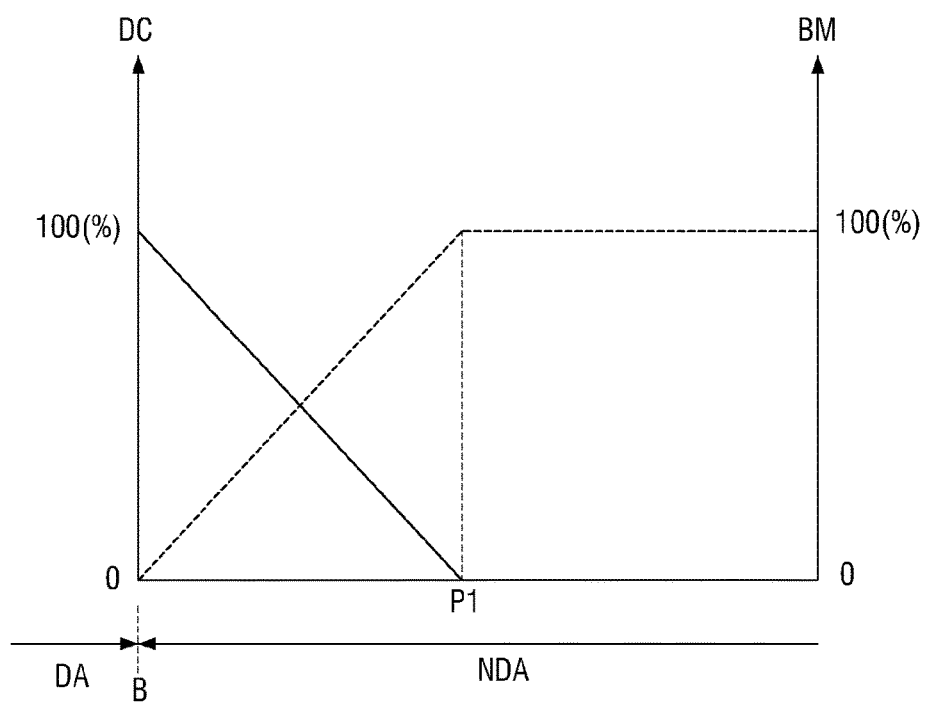

Referring to FIG. 13, in exemplary embodiments, the distribution density of the dummy color layer DC in a plan view is gradually decreased from the boundary B between the display area DA and the non-display area NDA to the first point P1, and thus the distribution density thereof may become substantially 0 at the first point P1. Therefore, the distribution density of the first light-blocking area BM may be gradually increased as the distribution density of the dummy color layer DC is gradually decreased from the boundary B between the display area DA and the non-display area NDA to the first point P1, and only the first light-blocking area BM may be substantially disposed from the first point P1.

Figure 14:
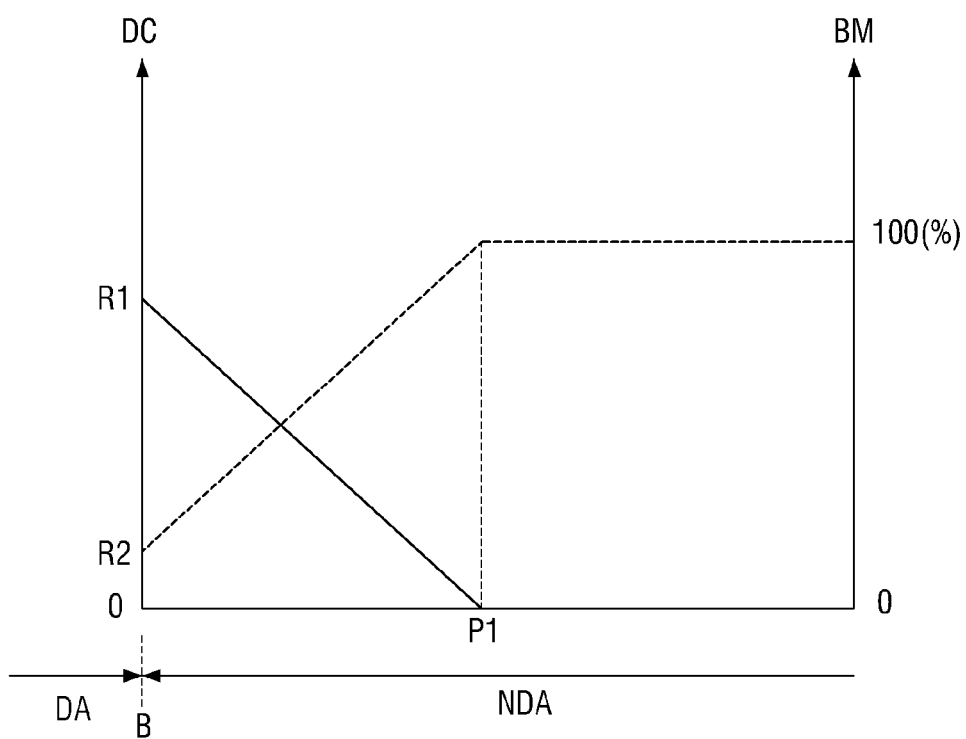

Referring to FIG. 14, in exemplary embodiments, the dummy color layer DC may be distributed at a ratio of R1 at the boundary B between the display area DA and the non-display area NDA, and the first light-blocking area BM may be distributed at a ratio of R2 at the boundary B between the display area DA and the non-display area NDA. In the embodiment of FIG. 4, a case that R1 is greater than R2 is illustrated, but the invention is not limited thereto. R1 may be substantially equal to R2, or R2 may be greater than R1. The distribution density of the dummy color layer DC is gradually decreased from the boundary B between the display area DA and the non-display area NDA to the first point P1, and thus the distribution density thereof may become substantially 0 at the first point P1. Therefore, the distribution density of the first light-blocking area BM may be gradually increased as the distribution density of the dummy color layer DC is gradually decreased from the boundary B between the display area DA and the non-display area NDA to the first point P1, and only the first light-blocking area BM may be substantially disposed from the first point P1.

Figure 15:
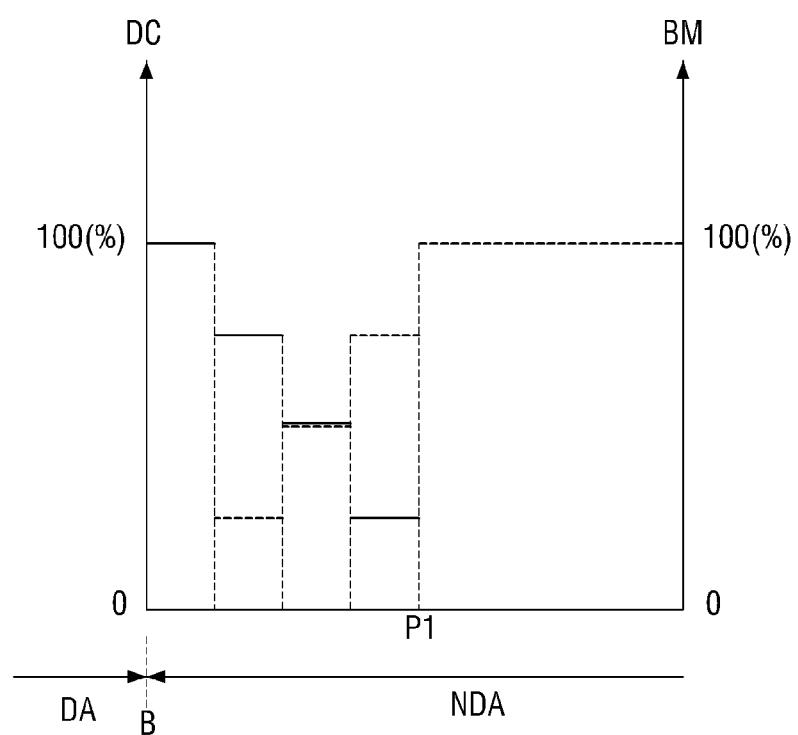

Referring to FIG. 15, the distribution density of the dummy color layer DC is gradually decreased in the form of a step from the boundary B between the display area DA and the non-display area NDA to the first point P1, and thus the distribution density thereof may become substantially 0 at the first point P1. In other words, the distribution density of the dummy color layer DC may be stepwisely decreased from the boundary B between the display area DA and the non-display area NDA to the first point P1. Therefore, the distribution density of the first light-blocking area BM may be gradually increased in the form of a step as the distribution density of the dummy color layer DC is gradually decreased in the form of a step from the boundary B between the display area DA and the non-display area NDA to the first point P1, and only the first light-blocking area BM may be substantially disposed from the first point P1.

In other words, the distribution density of the first light-blocking area BM may be stepwisely decreased from the boundary B to the outside of the non-display area NDA. That is, the distribution density of the dummy color layer DC may be complementarily decreased depending on the increase in the distribution density of the first light-blocking area BM.

Figure 16:
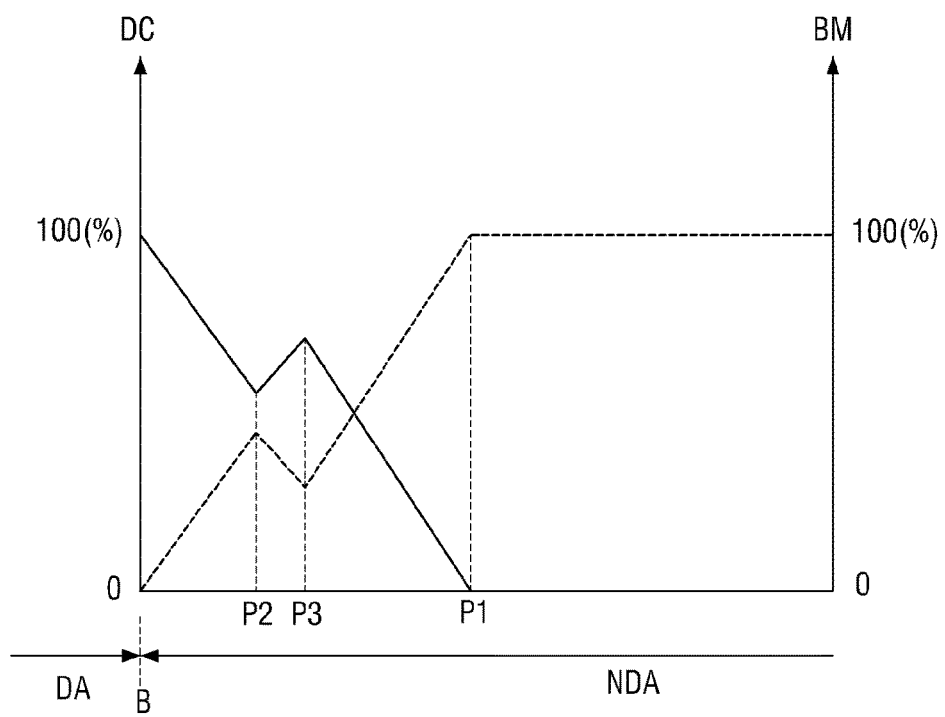

Referring to FIG. 16, the distribution density of the dummy color layer DC may be entirely decreased from the boundary B between the display area DA and the non-display area NDA to the first point P1, but may include a region/section (P2-P3) in which the distribution density of the dummy color layer DC is partially increased. The distribution density of the dummy color layer DC from the first point P1 may be substantially 0. Therefore, the distribution density of the first light-blocking area BM may be entirely increased as the distribution density of the dummy color layer DC may be entirely decreased from the boundary B between the display area DA and the non-display area NDA to the first point P1. Further, the first light-blocking area BM may include a section (P2-P3) in which the distribution density thereof is partially decreased as the dummy color layer DC includes a region/section (P2-P3) in which the distribution density thereof is partially increased. Only the first light-blocking area BM may be substantially disposed from the first point P1.

In other words, the distribution density of the dummy color layer DC may be irregularly increased from the boundary B to the outside of the non-display area NDA. In contrast, the distribution density of the first light-blocking area BM may be irregularly decreased from the boundary B to the outside of the non-display area NDA. Here, the meaning "the distribution density of the dummy color layer DC is irregularly increased" means that the maximum distribution density of the dummy color layer DC is provided around the boundary B, and the minimum distribution density of the dummy color layer DC is provided around the outside of the non-display area NDA. Similarly to this, the meaning "the distribution density of the first light-blocking area BM is irregularly increased" means that the minimum distribution density of the first light-blocking area BM is provided around the boundary B, and the maximum distribution density of the first light-blocking area BM is provided around the outside of the non-display area NDA. In other words, this means that the distribution density thereof reaches the maximum value and the minimum values, or at least one increase section or decrease section is disposed on a line extending from the maximum value to the minimum value.

That is, the distribution density of the dummy color layer DC may be complementarily decreased depending on the increase in the distribution density of the first light-blocking area BM.

Figure 17:
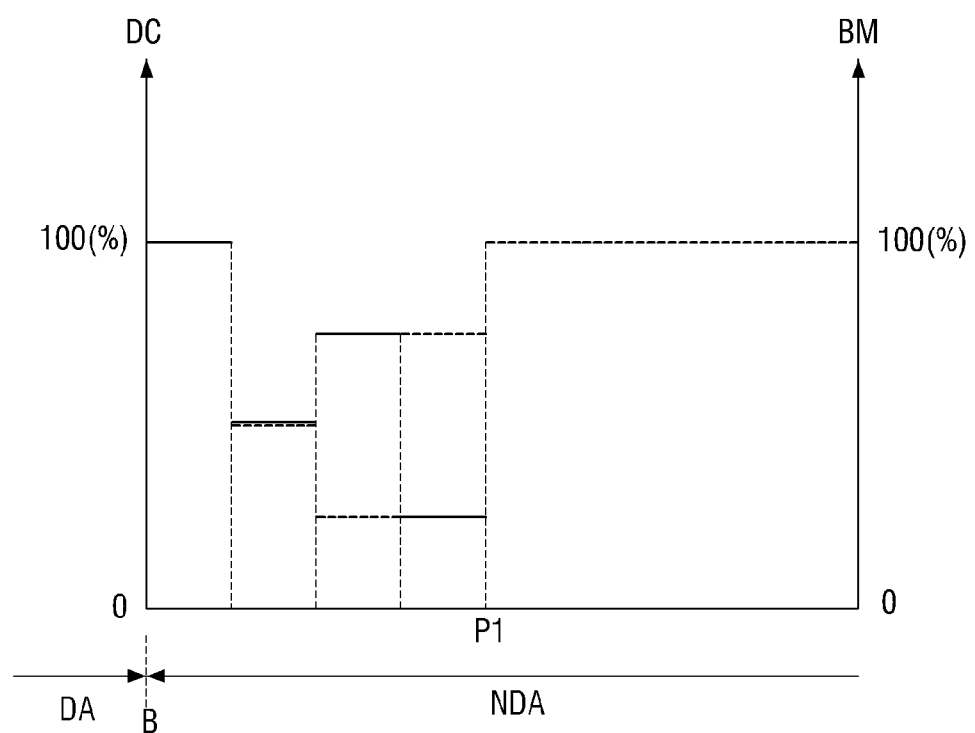

Referring to FIG. 17, the distribution density of the dummy color layer DC may be entirely decreased in the form of a step from the boundary B between the display area DA and the non-display area NDA to the first point P1, but may include a region/section (P2-P3) in which the distribution density of the dummy color layer DC is partially increased. The distribution density of the dummy color layer DC from the first point P1 may be substantially 0. Therefore, the distribution density of the first light-blocking area BM may be entirely increased in the form of a step as the distribution density of the dummy color layer DC may be entirely decreased in the form of a step from the boundary B between the display area DA and the non-display area NDA to the first point P1. Further, the first light-blocking area BM may include a section in which the distribution density thereof is partially decreased as the dummy color layer DC includes a section in which the distribution density thereof is partially increased. Only the first light-blocking area BM may be substantially disposed from the first point P1.

Hereinafter, cases that the distribution density of a dummy color layer is gradually decreased toward the outside of the display area DA will be described in more detail with reference to the drawings.

FIGS. 18 to 22 are plan views for explaining the structures of the non-display area of the LCD device according to another exemplary embodiment of the invention.

Figure 18:
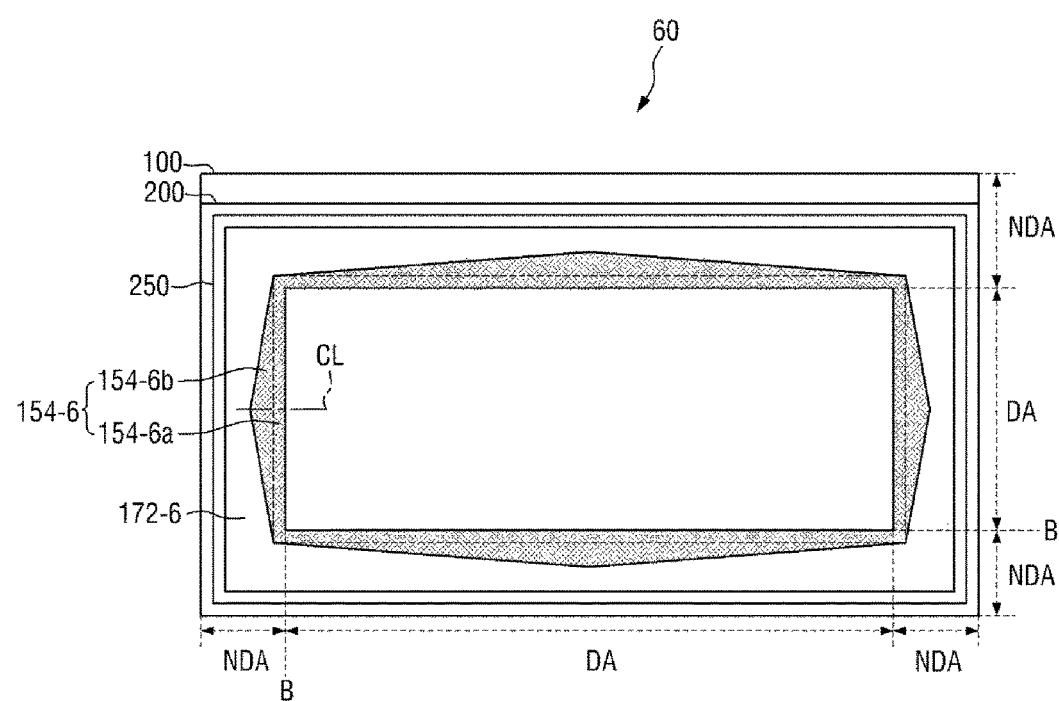
FIGS. 18 to 22 are plan views for explaining another exemplary embodiment of the structures of the non-display area of an LCD device according to the invention.

Referring to FIG. 18, the display device 60 according to another exemplary embodiment of the invention is the same as or similar to the display device 10 described with reference to FIGS. 1 to 6, except for a dummy color layer 154-6 and a first light-blocking layer 172-6. Hereinafter, differences, except for redundancy, will be described.

In the embodiment of FIG. 18, the dummy color layer 154-6 includes a first dummy color layer 154-6a and a second dummy color layer 154-6b. The first dummy color layer 154-6a may be substantially the same as the dummy color layer 154 of the display device 10 described with reference to FIGS. 1 to 6. The second dummy color layer 154-6b may extend from the first dummy color layer 154-6a. That is, the second dummy color layer 154-6b may be unitary with the first dummy color layer 154-6a. However, this is an exemplary embodiment, and the invention is not limited thereto.

The distribution density of the second dummy color layer 154-6b in a plan view may be gradually decreased toward the outside of the display area DA. In an exemplary embodiment, when the display area DA has a rectangular shape in a plan view, the non-display area NDA may have a rectangular ban shape. In this case, as shown in FIG. 18, the distribution density of the second dummy color layer 154-6b may be gradually decreased toward left and right based on the center line CL perpendicular to each of the sides constituting the boundary B of the display area DA. Therefore, the second dummy color layer 154-6b may include a triangular shape in a plan view.

The first light-blocking layer 172-6 may include a section in which the distribution density thereof is gradually increased as the distribution density of the second dummy color layer 154-6b is gradually decreased toward left and right based on the center line CL perpendicular to each of the sides constituting the boundary B of the display area DA.

Figure 19:
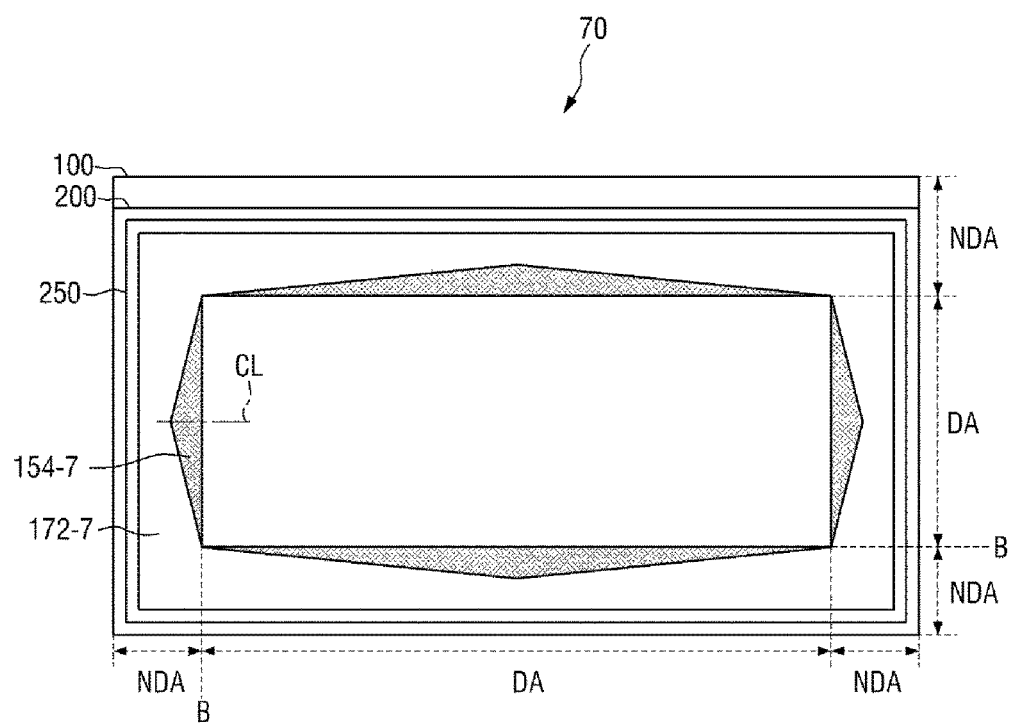

Referring to FIG. 19, the display device 70 according to another exemplary embodiment of the invention is the same as or similar to the display device 10 described with reference to FIGS. 1 to 6, except for a dummy color layer 154-7 and a first light-blocking layer 172-7. Hereinafter, differences, except for redundancy, will be described.

In the embodiment of FIG. 19, the distribution density of the dummy color layer 154-7 in a plan view may be gradually decreased toward the outside of the display area DA. In an exemplary embodiment, when the display area DA has a rectangular shape in a plan view, the non-display area NDA may have a rectangular ban shape. In this case, as shown in FIG. 19, the distribution density of the dummy color layer 154-7 may be gradually decreased toward left and right based on the center line CL perpendicular to each of the sides constituting the boundary B of the display area DA. Therefore, the dummy color layer 154-7 may include a triangular shape in a plan view. That is, in the embodiment of FIG. 19, the shape of the dummy color layer 154-7 in a plan view may be substantially the same as the shape of the aforementioned second dummy color layer 154-6b described with reference to FIG. 18.

The first light-blocking layer 172-7 may include a section in which the distribution density thereof is gradually increased as the distribution density of the dummy color layer 154-7 is gradually decreased toward left and right based on the center line CL perpendicular to each of the sides constituting the boundary B of the display area DA.

Figure 20:
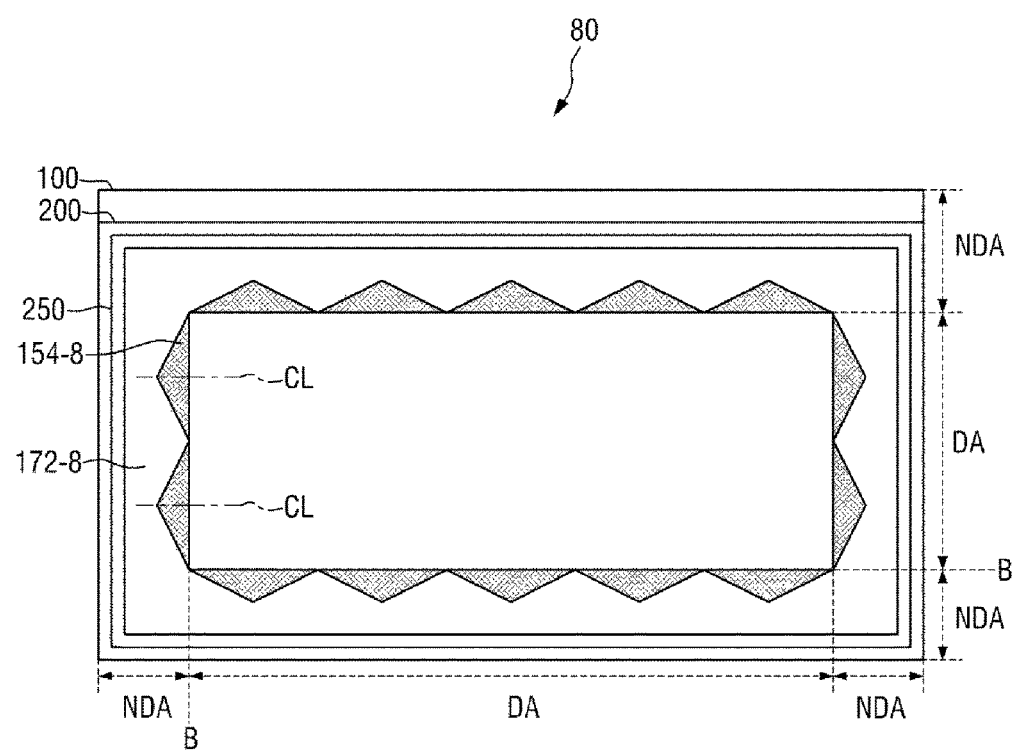

Referring to FIG. 20, the display device 80 according to another exemplary embodiment of the invention is the same as or similar to the display device 10 described with reference to FIGS. 1 to 6, except for a dummy color layer 154-8 and a first light-blocking layer 172-8. Hereinafter, differences, except for redundancy, will be described.

In the embodiment of FIG. 20, the distribution density of the dummy color layer 154-8 in a plan view may be gradually decreased toward the outside of the display area DA. In an exemplary embodiment, when the display area DA has a rectangular shape in a plan view, the non-display area NDA may have a rectangular ban shape, for example. In this case, as shown in FIG. 20, the distribution density of the dummy color layer 154-8 may be gradually decreased toward left and right based on a plurality of center lines CL perpendicular to each of the sides constituting the boundary B of the display area DA. Therefore, the dummy color layer 154-8 may include a triangular shape in a plan view.

The first light-blocking layer 172-8 may include a section in which the distribution density thereof is gradually increased as the distribution density of the dummy color layer 154-8 is gradually decreased toward left and right based on the plurality of center lines CL perpendicular to each of the sides constituting the boundary B of the display area DA.

Figure 21:
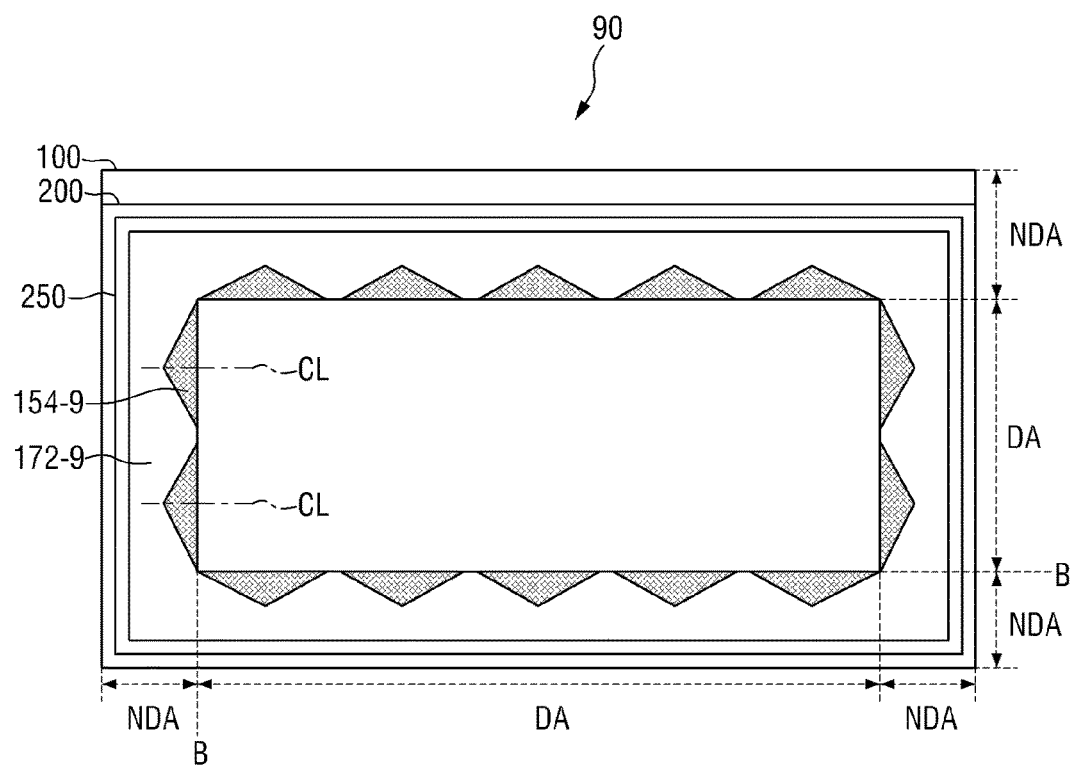

Referring to FIG. 21, the display device 90 according to another exemplary embodiment of the invention is the same as or similar to the display device 10 described with reference to FIGS. 1 to 6, except for a dummy color layer 154-9 and a first light-blocking layer 172-9. Hereinafter, differences, except for redundancy, will be described.

In the embodiment of FIG. 21, the distribution density of the dummy color layer 154-9 in a plan view may be gradually decreased toward the outside of the display area DA. In an exemplary embodiment, when the display area DA has a rectangular shape in a plan view, the non-display area NDA may have a rectangular ban shape, for example.

As shown in FIG. 21, the distribution density of the dummy color layer 154-9 may be gradually decreased toward left and right based on a plurality of center lines CL perpendicular to each of the sides constituting the boundary B of the display area DA. The dummy color layer 154-9 is disposed in the non-display area NDA. The dummy color layer 154-9 is disposed adjacent to the boundary B between the non-display area NDA and the display area DA. The dummy color layer 154-9 is disposed along the outer periphery of the display area DA, but may include disconnected portions. In an exemplary embodiment, as shown in FIG. 21, the dummy color layer 154-9 is disposed along the outer periphery of the non-display area NDA, but may include disconnected portions. Therefore, the first light-blocking layer 172-9 and the second light-blocking layer 174 may be connected with each other. That is, the first light-blocking layer 172-9 and the second light-blocking layer 174 may be unitary.

The first light-blocking layer 172-9 may include a section in which the distribution density thereof is gradually increased as the distribution density of the dummy color layer 154-9 is gradually decreased toward left and right based on the plurality of center lines CL perpendicular to each of the sides constituting the boundary B of the display area DA.

Figure 22:
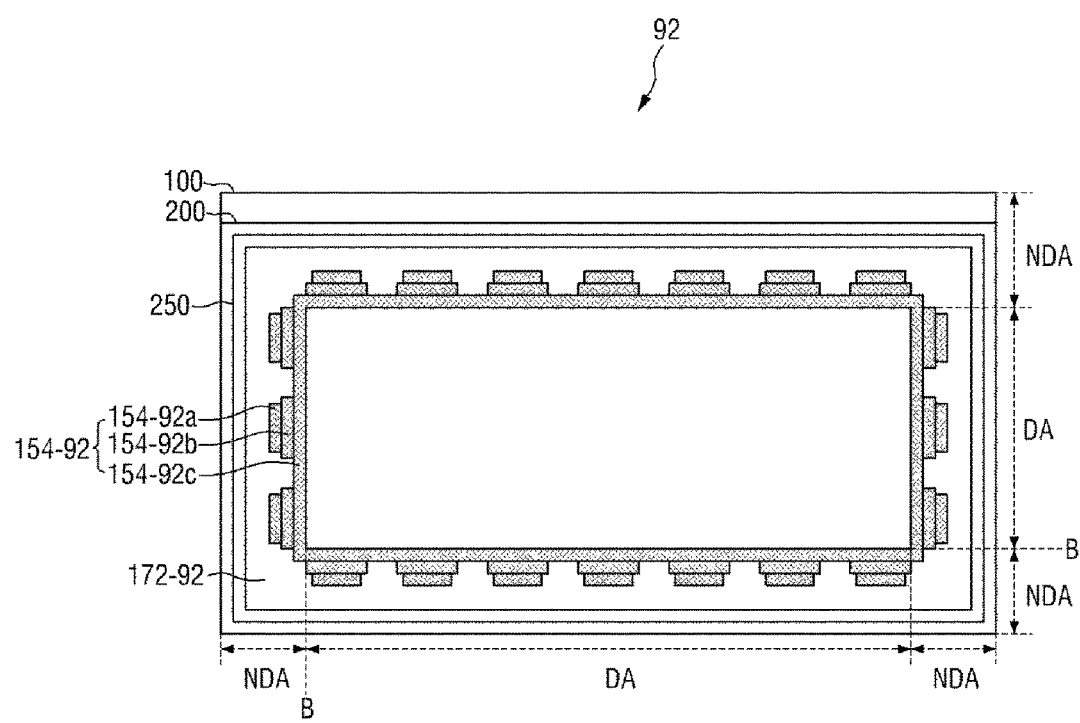

Referring to FIG. 22, the display device 92 according to another exemplary embodiment of the invention is the same as or similar to the display device 10 described with reference to FIGS. 1 to 6, except for a dummy color layer 154-92 and a first light-blocking layer 172-92. Hereinafter, differences, except for redundancy, will be described.

In the embodiment of FIG. 22, the dummy color layer 154-92 includes a first dummy color layer 154-92a, a second dummy color layer 154-92b, and a third dummy color layer 154-92c. The first dummy color layer 154-92a may be substantially the same as the dummy color layer 154 of the display device 10 described with reference to FIGS. 1 to 6. The second dummy color layer 154-92b may extend from the first dummy color layer 154-92a. The third dummy color layer 154-92c may extend from the second dummy color layer 154-92b. That is, the first dummy color layer 154-92a, the second dummy color layer 154-92b, and the third dummy color layer 154-92c may be unitary with one another. However, this is an exemplary embodiment, and the invention is not limited thereto.

As shown in FIG. 22, the distribution density of the dummy color layer 154-92 may be gradually decreased in the form of a step from the boundary B between the display area DA and the non-display area NDA to the outside of the display area DA. Therefore, the first light-blocking layer 172-92 may include a section in which the distribution density thereof is gradually increased in the form of a step from the boundary B between the display area DA and the non-display area NDA to the outside of the display area DA.

As described above, according to the display device according to an exemplary embodiment of the invention, it is possible to prevent the occurrence of light leakage at the edge of the display area thereof.

Further, when the aforementioned structural characteristics are applied, liquid crystals are stably injected over the entire area of the display device, thereby improving the display quality of the display device. The effects of the invention are not limited by the foregoing, and other various effects are anticipated herein.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:
1. A display device, comprising:
   a first substrate and a second substrate which face each other, and each of which includes a display area and a non-display area disposed outside the display area;
   a first light-blocking layer disposed in the non-display area; and
   a dummy color layer, in which a boundary dividing the display area and the non-display area is defined, and which is disposed in the non-display area of the first substrate and adjacent to the boundary,
   wherein the dummy color layer includes a section in which a distribution density of the dummy color layer is decreased from the boundary to an outside of the non-display area.
2. The display device of claim 1,
   wherein the first light-blocking layer includes a section in which a distribution density of the first light-blocking layer is increased from the boundary to the outside of the non-display area.
3. The display device of claim 2,
   wherein the section of the first light-blocking layer and the section of the dummy color layer at least partially overlap each other.
4. The display device of claim 1, wherein an opening portion at least partially penetrating the first light-blocking layer is defined in the display device, and
   wherein the opening portion exposes at least partially an upper surface of the dummy color layer.

5. The display device of claim 4,
wherein the opening portion includes a section in which a distribution density of the opening portion is decreased from the boundary to the outside of the non-display area.

6. The display device of claim 5,
wherein the section of the opening portion and the section of the dummy color layer at least partially overlap each other.

7. The display device of claim 4, further comprising:
a second light-blocking layer disposed in the display area of the first substrate,
wherein the first light-blocking layer and the second light-blocking layer are spaced apart from each other with the opening portion therebetween.

8. The display device of claim 1,
wherein the dummy color layer includes a first dummy color layer and a second dummy color layer disposed on the first dummy color layer, and at least one of the first dummy color layer and the second dummy color layer is a blue dummy color layer.

9. The display device of claim 8,
wherein the dummy color layer further includes a third dummy color layer disposed on the second dummy color layer, and at least one of the first dummy color layer, the second dummy color layer, and the third dummy color layer is a blue dummy color layer.

10. The display device of claim 1, further comprising:
a lower metal layer disposed in the non-display area of the first substrate,
wherein a stepped portion overlapping the lower metal layer is defined in the first light-blocking layer.

11. The display device of claim 10,
wherein a width of the lower metal layer is equal to or greater than a width of the stepped portion.

12. The display device of claim 1,
wherein the dummy color layer is intermittently disposed along the boundary.

13. A display device, comprising:
a first substrate and a second substrate which face each other, and each of which includes a display area and a non-display area disposed outside the display area;
a first light-blocking layer disposed in the non-display area; and
a dummy color layer, in which a boundary dividing the display area and the non-display area is defined, and which is disposed in the non-display area of the first substrate and adjacent to the boundary,
wherein a distribution density of the first light-blocking layer is increased from the boundary to an outside of the non-display area, and a distribution density of the dummy color layer is complementarily decreased from the boundary to the outside of the non-display area depending on an increase in the distribution density of the first light-blocking layer.

14. The display device of claim 13,
wherein the distribution density of the first light-blocking layer is stepwisely increased from the boundary to the outside of the non-display area, and thus the distribution density of the dummy color layer is stepwisely decreased from the boundary to the outside of the non-display area.

15. The display device of claim 13,
wherein the distribution density of the first light-blocking layer is irregularly increased from the boundary to the outside of the non-display area, and thus the distribution density of the dummy color layer is irregularly decreased from the boundary to the outside of the non-display area.

16. The display device of claim 13, wherein an opening portion at least partially penetrating the first light-blocking layer is defined in the display device,
wherein the opening portion exposes at least partially an upper surface of the dummy color layer.

17. The display device of claim 16, further comprising:
a second light-blocking layer disposed in the display area of the first substrate,
wherein the first light-blocking layer and the second light-blocking layer are spaced apart from each other with the opening portion therebetween.

18. The display device of claim 13,
wherein the dummy color layer includes a first dummy color layer and a second dummy color layer disposed on the first dummy color layer, and at least one of the first dummy color layer and the second dummy color layer is a blue dummy color layer.

19. The display device of claim 18,
wherein the dummy color layer further includes a third dummy color layer disposed on the second dummy color layer, and at least one of the first dummy color layer, the second dummy color layer, and the third dummy color layer is a blue dummy color layer.

20. The display device of claim 13, further comprising:
a lower metal layer disposed in the non-display area of the first substrate,
wherein a stepped portion overlapping the lower metal layer is defined in the first light-blocking layer.

21. The display device of claim 20,
wherein a width of the lower metal layer is equal to or greater than a width of the stepped portion.

* * * * *